United States Patent
Rangadass et al.

(10) Patent No.: US 8,239,426 B2
(45) Date of Patent: *Aug. 7, 2012

(54) DATA MANAGEMENT SYSTEM PROVIDING A DATA THESAURUS FOR MAPPING BETWEEN MULTIPLE DATA SCHEMAS OR BETWEEN MULTIPLE DOMAINS WITHIN A DATA SCHEMA

(75) Inventors: Vasudev Rangadass, Arlington, TX (US); Pallab K. Chatterjee, Plano, TX (US)

(73) Assignee: JDA Software Group, Inc., Scottsdale, AZ (US)

( * ) Notice: Subject to any disclaimer, the term of this patent is extended or adjusted under 35 U.S.C. 154(b) by 370 days.

This patent is subject to a terminal disclaimer.

(21) Appl. No.: 11/877,857

(22) Filed: Oct. 24, 2007

(65) Prior Publication Data

US 2008/0281824 A1 Nov. 13, 2008

Related U.S. Application Data

(63) Continuation of application No. 10/840,928, filed on May 7, 2004, now Pat. No. 7,310,646.

(60) Provisional application No. 60/469,279, filed on May 9, 2003.

(51) Int. Cl.
*G06F 17/30* (2006.01)
(52) U.S. Cl. .......................... 707/809; 707/694; 707/792
(58) Field of Classification Search .................. 707/1, 8, 707/10, 100, 101, 102, 103 R, 103 X, 103 Y, 707/103 Z, 201, 204, 792, 796, 802, 803, 707/809, 810, 690, 694, 807, 999.1, 999.101, 707/999.102, 999.104, 999.106, 999.107
See application file for complete search history.

(56) References Cited

U.S. PATENT DOCUMENTS

| | | | |
|---|---|---|---|
| 5,414,812 A | * | 5/1995 | Filip et al. ..................... 707/694 |
| 6,041,325 A | | 3/2000 | Shah et al. |
| 6,826,571 B1 | | 11/2004 | Baer et al. |
| 6,912,561 B1 | | 6/2005 | Baer et al. |

(Continued)

OTHER PUBLICATIONS

V. Rangadass, "Master Data Management System for Centrally Managing Core Reference Data Associated with an Enterprise", U.S. Appl. No. 10/755,437, filed Jan. 12, 2004.

(Continued)

*Primary Examiner* — Greta Robinson
(74) *Attorney, Agent, or Firm* — Booth Udall, PLC; Steven J. Laureanti

(57) ABSTRACT

In one embodiment, a system is provided for managing a centrally managed master repository for core enterprise reference data associated with an enterprise. A centralized master repository contains the reference data, the reference data being associated with multiple schemas, each schema including one or more data models for reference data, each data model including one or more fields. A data management services framework coupled to the repository provides services for managing the reference data in the repository. The services framework supports a master schema including a union of multiple models and associated fields in the multiple schemas. The services framework also supports a thesaurus including, for each field in the master schema, a set of synonyms each representing a mapping between the field in the master schema and a corresponding field in a particular one of the multiple schemas. The master schema and thesaurus facilitate centralized management of the reference data in the repository across multiple heterogeneous external operational systems that have different associated data models and are provided indirect access to the reference data in the repository for operational use of the reference data according to associated business workflows.

21 Claims, 10 Drawing Sheets

U.S. PATENT DOCUMENTS

| | | | |
|---|---|---|---|
| 6,917,939 B1 | 7/2005 | Baer et al. | |
| 6,922,724 B1 | 7/2005 | Freeman et al. | |
| 7,111,018 B1 | 9/2006 | Goodrich et al. | |
| 7,120,596 B2* | 10/2006 | Hoffman et al. | 705/28 |
| 7,171,379 B2* | 1/2007 | Menninger et al. | 705/28 |
| 7,213,037 B2 | 5/2007 | Rangadass | |
| 7,310,646 B2* | 12/2007 | Rangadass et al. | 707/100 |
| 2002/0013827 A1* | 1/2002 | Edstrom et al. | 709/219 |
| 2002/0186254 A1 | 12/2002 | Monbaron | |
| 2003/0126136 A1* | 7/2003 | Omoigui | 707/10 |
| 2007/0208765 A1* | 9/2007 | Li et al. | 707/101 |

OTHER PUBLICATIONS

V. Rangadass, "Master Data Management System for Centrally Managing Core Reference Data Associated with an Enterprise", U.S. Appl. No. 10/847,422, filed May 17, 2004.

V. Rangadass, "Master Data Management System for Centrally Managing Core Reference Data Associated with an Enterprise", U.S. Appl. No. 10/847,037, filed May 17, 2004.

V. Rangadass, "Enterprise Solution Framework Incorporating a Master Data Management System for Centrally Managing Core Reference Data Associated with an Enterprise", U.S. Appl. No. 10/847,009, filed May 17, 2004.

* cited by examiner

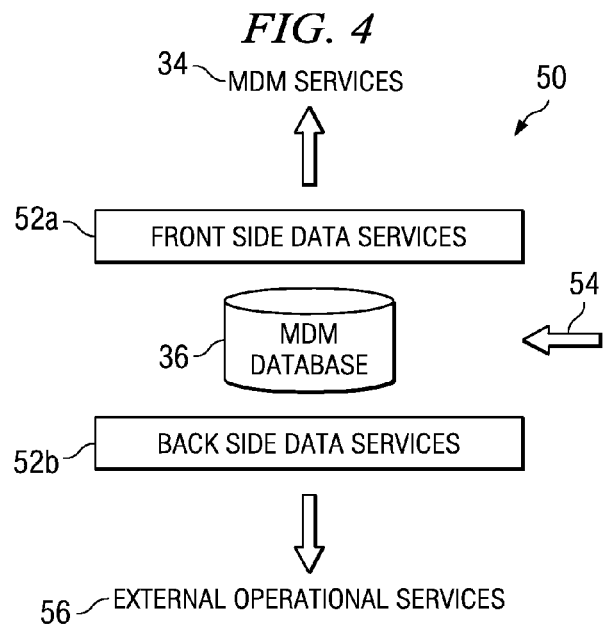
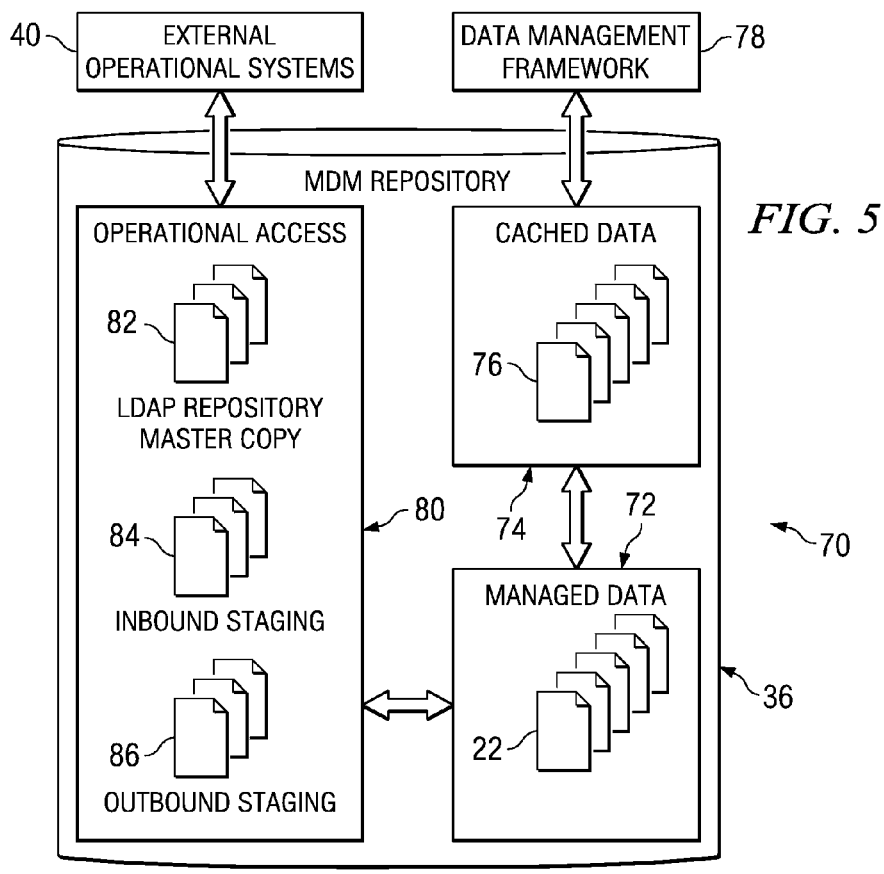

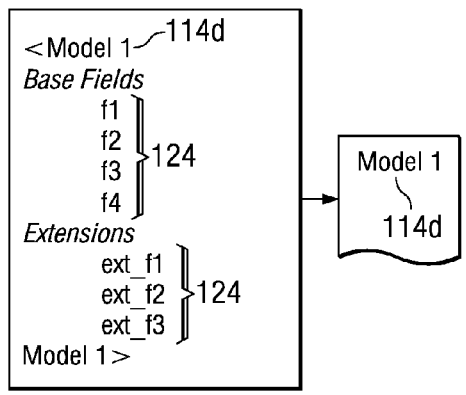
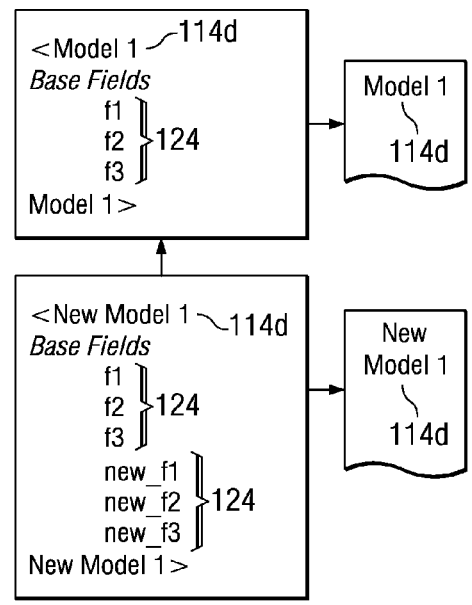
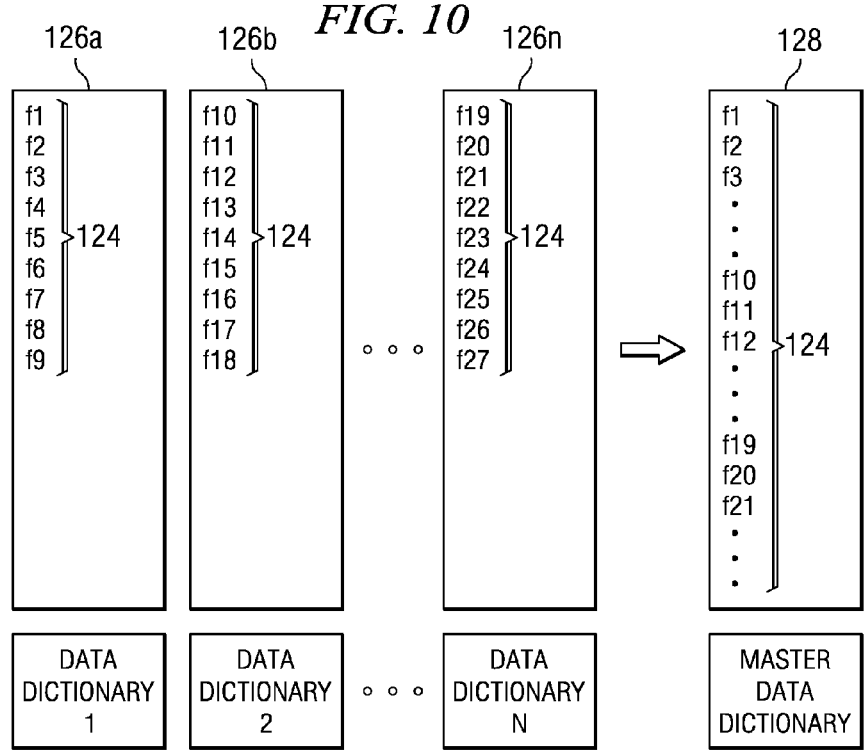

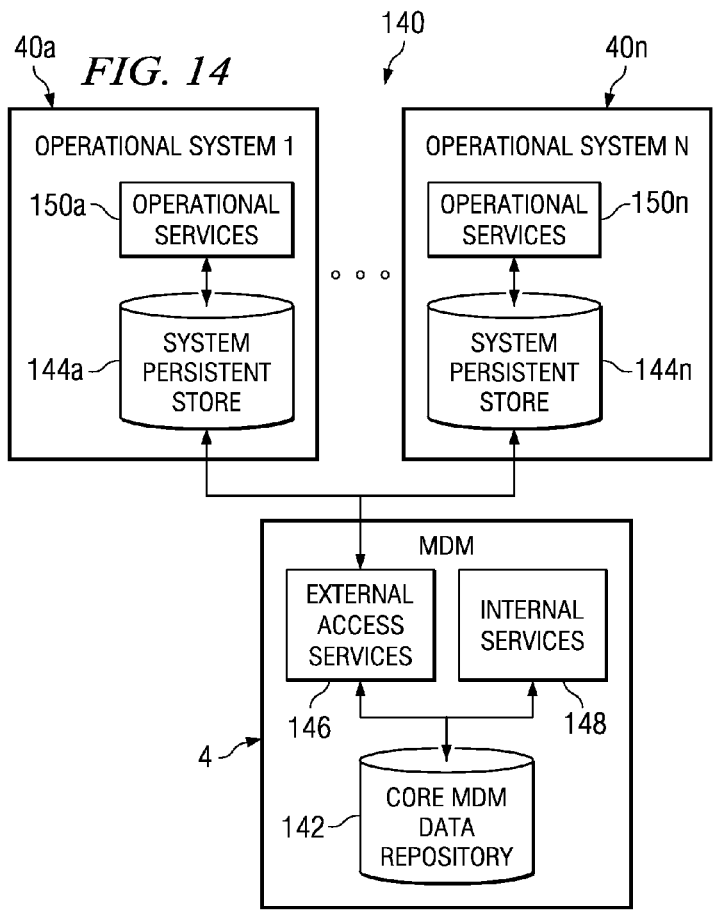
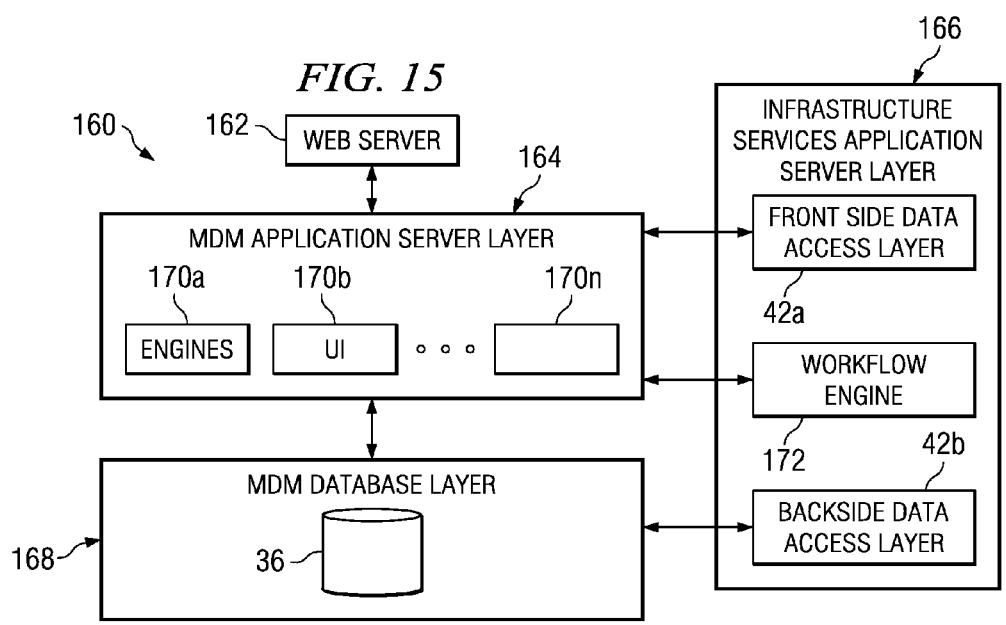

DATA MANAGEMENT SYSTEM PROVIDING A DATA THESAURUS FOR MAPPING BETWEEN MULTIPLE DATA SCHEMAS OR BETWEEN MULTIPLE DOMAINS WITHIN A DATA SCHEMA

CLAIM OF PRIORITY

This application is a continuation of U.S. patent application Ser. No. 10/840,928, filed on 7 May 2004 and entitled "DATA MANAGEMENT SYSTEM PROVIDING A DATA THESAURUS FOR MAPPING BETWEEN MULTIPLE DATA SCHEMAS OR BETWEEN MULTIPLE DOMAINS WITHIN A DATA SCHEMA", now U.S. Pat. No. 7,310,646 which claims the benefit under 35 U.S.C. §119(e) of U.S. Provisional Application Ser. No. 60/469,279, filed 9 May 2003 and entitled "USING ONE OR MORE THESAURUS FOR MAPPING BETWEEN MULTIPLE DATA SCHEMAS OR BETWEEN MULTIPLE DOMAINS WITHIN A DATA SCHEMA".

U.S. Pat. No. 7,310,646 and U.S. Provisional Application Ser. No. 60/469,279 are commonly assigned to the assignee of the present application. The disclosure of related U.S. Pat. No. 7,310,646 and U.S. Provisional Application Ser. No. 60/469,279 are hereby incorporated by reference into the present disclosure as if fully set forth herein.

BACKGROUND

1. Technical Field of the Invention

This invention relates generally to data management, and more particularly to a data management system providing a data thesaurus for mapping between multiple data schemas or between multiple domains within a data schema.

2. Background of the Invention

An enterprise may use a master data management system to address management of enterprise data. A considerable amount of data is required to adequately define an enterprise. The data may be of two fundamental types. A first type of data, which may be referred to as core enterprise reference data, describes the structure and characteristics of the enterprise and its entities and is not transient or transactional in nature. This type of data may be associated with enterprise data masters and may be stored in a core reference data repository, although such data is not restricted to the type of data associated with traditional enterprise data masters. Efficient handling this data is critical, as is orderly and process-driven management of the state of the data. Use of this data is, in general, not limited to particular portions of the enterprise; rather, this data is typically used pervasively throughout the enterprise and with its value chain partners. The second type of data, which may be referred to as operational data, is transient transactional data required by planning, execution, monitoring, or other enterprise solution components. This type of data is typically not stored in the core reference data repository; the master data management system provides a staging and distribution framework for such data. A problem facing many enterprises is to create a system that provides for effective and scalable management, distribution, and use of both its core enterprise reference data and its transactional data in a manner that services needs for this data within the enterprise as a whole and also specific needs of planning, execution, monitoring, and other enterprise solution components associated with the enterprise.

SUMMARY OF THE INVENTION

In one embodiment, a system is provided for managing a centrally managed master repository for core enterprise reference data associated with an enterprise. A centralized master repository contains the core enterprise reference data, the core enterprise reference data being associated with multiple data schemas, each data schema including one or more data models for core enterprise reference data, each data model including one or more fields. A data management services framework coupled to the centralized master repository provides services for managing the core enterprise reference data in the centralized master repository. The services framework supports a master data schema including a union of the multiple data models and associated fields in the multiple data schemas. The services framework also supports a data thesaurus including, for each field in the master data schema, a set of field synonyms each representing a mapping between the field in the master data schema and a corresponding field in a particular one of the multiple data schemas. The master data schema and the data thesaurus facilitate centralized management of the core enterprise reference data in the centralized master repository across multiple heterogeneous external operational systems that have different associated data models and are provided indirect access to the core enterprise reference data in the centralized master repository for operational use of the core enterprise reference data according to associated business workflows.

Particular embodiments of the present invention may provide one or more technical advantages. For example, certain embodiments may provide an enterprise framework incorporating classification into configuration, planning, execution, and monitoring segments. Certain embodiments may provide a secure system of record optimized in architecture and design for management of core enterprise reference data. Certain embodiments may allow for full or partial automation of important time-and labor-intensive business processes according to embedded enterprise-level business workflows. Certain embodiments may support one or more thesaurus for mapping between multiple data schemas or between multiple domains within a data schema. Certain embodiments of the present invention may provide all, some, or none of these technical advantages. Certain embodiments may provide one or more other technical advantages, one or more of which may be readily apparent to those skilled in the art from the figures, description, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIG. 4 illustrates an example high level logical data services architecture for an MDM system;

FIG. 5 illustrates an example high level logical architecture of an MDM database;

FIGS. 9A and 9B illustrate example methods for extending a reference data model within an MDM system;

FIG. 10 illustrates example data dictionaries for schemas within an MDM system;

FIG. 14 illustrates an example MDM use model;

FIG. 15 illustrates an example high level physical architecture for an MDM system.

DETAILED DESCRIPTION OF THE DRAWINGS

I. Enterprise Solution Framework

Figure 1:
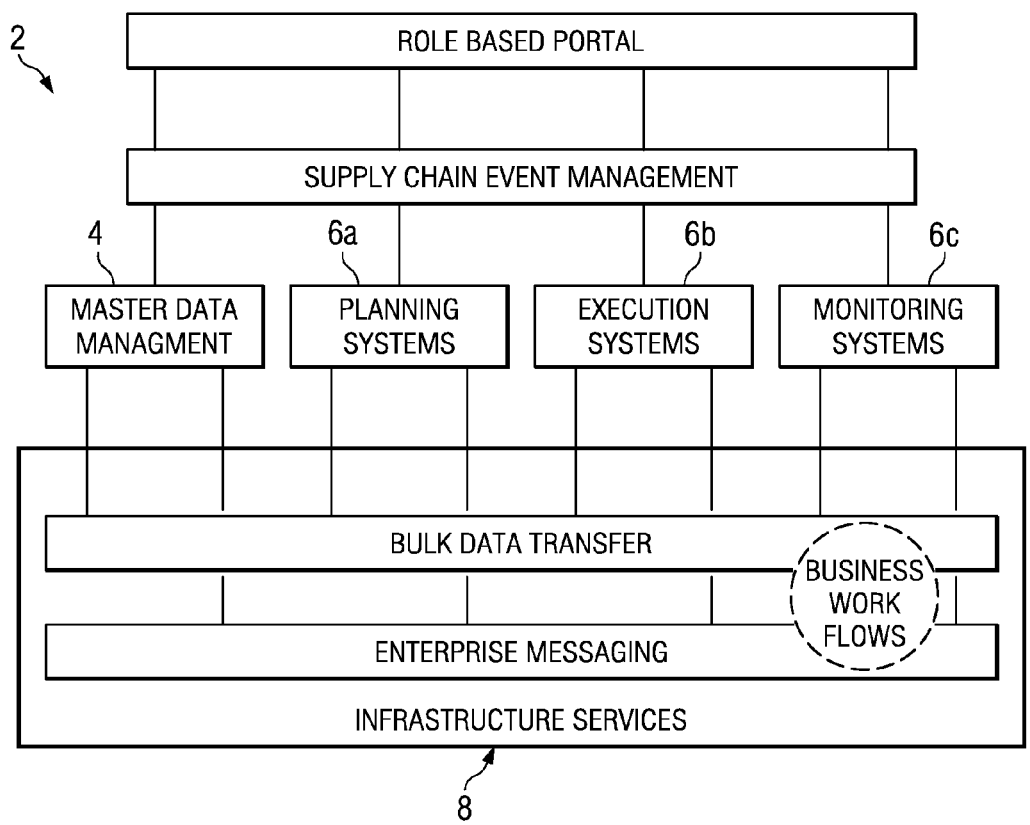
FIG. 1 illustrates an example enterprise application framework including a master data management (MDM) system.

FIG. 1 illustrates an example enterprise solution framework 2 including an MDM system 4. In one embodiment, framework 2 includes a classification of an associated enterprise into four fundamental segments: (1) configuration of the enterprise and its entities~(2) planning with respect to the enterprise and its entities; that is, decisions about what to do; (3) execution with respect to the enterprise and its entities; that is, acting upon those decisions; and (4) monitoring with respect to the enterprise and its entities; that is, monitoring the results of those decisions and supplying feedback to the configuration and planning segments accordingly. In this embodiment, MDM system 4 represents the configuration segment, while the planning, execution, and monitoring enterprise solution components 6 represent the planning, execution, and monitoring segments, respectively. That is, enterprise solution components 6 comprise planning systems 6a, execution systems 6b, and monitoring systems 6c.

MDM system 4 provides centralized storage and management of enterprise reference data, maintaining reference data and associated data management processes separate from enterprise solution components 6 and associated operational processes while making reference data available to enterprise solution components 6 for consumption as needed. Centralized storage and management of reference data for existing and future enterprise solution components 6 may facilitate extension or other modification of enterprise solution components 6 without needing to modify reference data within MDM system 4. Centralized storage and management of reference data may also facilitate integration of enterprise solution components 6, for example, when one enterprise solution component 6 is replaced with another or an enterprise solution component providing an entirely new business function is introduced. Centralized storage and management of reference data may further facilitate integration of one enterprise into another, for example, in connection with a merger or acquisition. Where appropriate in certain embodiments, MDM system 4 may be referred to as a reference data management, master data management, or other centralized data management system.

Infrastructure services 8 provide bulk data transfer and enterprise messaging between MDM and enterprise, solution components 6 in accordance with business workflows operating in association with infrastructure services 8. These workflows, which may be embedded partially within MDM system 4 and partially within infrastructure services 8, may incorporate customized business best practices of the enterprise. In addition, these workflows may be wholly or partially automated using an appropriate enterprise-level workflow engine and appropriate MDM resources available to that workflow engine.

In one embodiment, MDM system 4 may support one or more thesaurus for mapping between multiple data schemas or between multiple domains within a data schema. Although such thesaurus may be used advantageously in connection with MDM system 4, the present invention contemplates using such thesaurus in any suitable data management context.

II. MDM Logical Business Architecture

Figure 2:
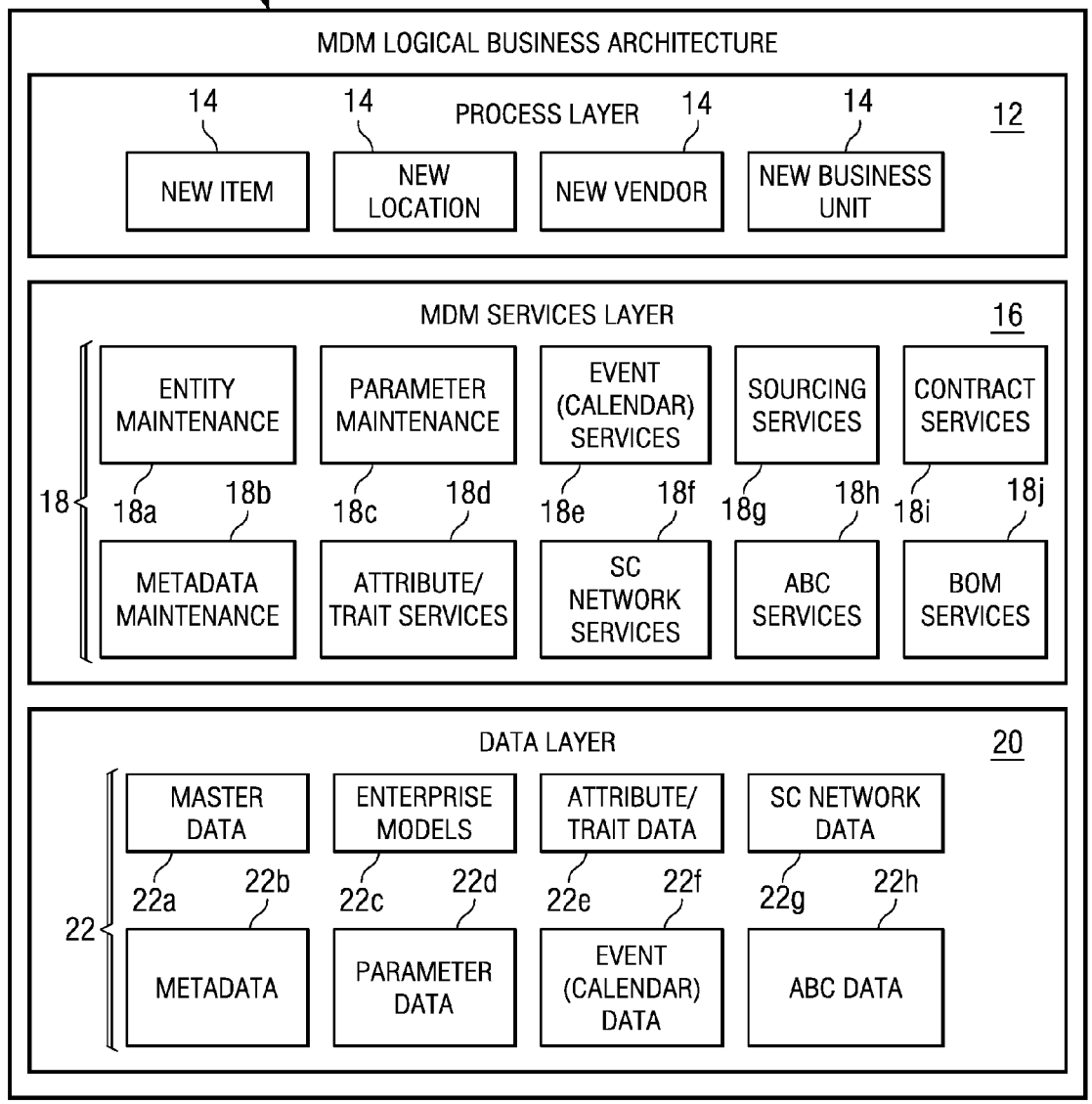
FIG. 2 illustrates an example high level logical business architecture for an MDM system.

FIG. 2 illustrates an example high level logical business architecture 10 for an MDM system 4. In general, the logical business architecture represents a business-centric view of MDM system 4 and includes core business processes, services, and data elements that MDM system 4 may be required to provide depending on the nature of the enterprise associated with MDM system 4. In one embodiment, MDM system 4 includes a process layer 12 that provides a context for implementing and wholly or partially automating business configuration processes 14. A service layer 16 underlying process layer 12 provides services 18 providing functions enabling process tasks that are appropriate for processes 14. A data layer 20 underlying service layer 16 provides base data models and physical representations for storing core enterprise reference data 22 for retrieval and use in connection with processes 14 and associated services 18.

An understanding of the fundamental concepts relating to the purposes and functions of MDM system 4 may aid in understanding the MDM architecture. At the core of MDM system 4 is the concept of data management, which encompasses both what data is stored and how that data is stored and made available for use. Since MDM system 4 is primarily concerned with structural data describing the enterprise or, more precisely, with data associated with entities within the business structure of the enterprise, the focus of the MDM architecture is on the storage, management, and retrieval of data associated with entities or with relationships between entities. In one embodiment, MDM system 4 provides such data storage, management, and retrieval using a core MDM reference data repository based on a multi-dimensional database construct.

Consider the following example. One example of an entity associated with a retail enterprise is an item. Items may have attributes such as size, weight, color, etc. If a particular entity, in this case a particular item, is considered a coordinate in a first dimension representing items, then the attributes of the particular item entity are associated with the coordinate for the particular item in the item dimension. At this point, the example involves only a one-dimensional line space, where discrete points on the line represent particular items.

Another example of an entity associated with an enterprise is a store or other location. Locations may have attributes such as size, physical address, etc. Like the particular item discussed above, a particular location may be considered a coordinate in a second dimension representing locations, where the attributes of the particular location entity are associated with the coordinate for the particular location in the location dimension. At this point, the example involves two one-dimensional line spaces, where discrete points on the first line represent particular items and discrete points on the second line represent particular locations. The example may be extended to include attributes that depend on the combination of a particular item and a particular location. Neither the item dimension nor the location dimension alone will suffice to store such multi-dimensional attributes. However, if the item and location dimensions are viewed as axes, and each intersection of item and location coordinates within an area defined by an orthogonal arrangement of these axes is viewed as a (item, location) point in two-dimensional entity space at which such attributes are stored, the concept becomes clear.

The example can be further extended to include attributes that depend on the combination of any number of arbitrary entity dimensions, leading to the concept of attributes as generalized data stored at and retrieved from points in an n-dimensional entity space. For example, a particular three-dimensional entity space suitable for an example retail enterprise might include item, location, and time dimensions, where attributes stored at each (item, location, time) point within a volume defined by all orthogonal arrangement of these axes corresponds to a particular combination of entities in the item, location, and time dimensions. In one embodiment; all reference data 22 stored within MDM system 4 may be equivalent to an attribute associated with a point in n-dimensional entity space.

In one embodiment, an overriding characteristic of all data that is considered for inclusion within MDM system 4 is the multi-dimensional database construct described above. Hence, a core architectural principle for MDM system 4 may be to accommodate a dimensional data structure as a core element in every component of MDM system 4. This may have several important implications for the MDM architecture and design. Such important implications may include, without limitation: (1) a consistent mechanism for locating points in an n-dimensional entity space; (2) a consistent mechanism for storing data at and retrieving data from points in an n-dimension entity space; and (3) ensuring that all distinct data storage components support the above.

Another fundamental concept for MDM system 4 may involve optimization of the physical architecture and database structures for the desired functions of MDM system 4. The core MDM reference data repository, as described above, is primarily for data management and is structured to provide a rich data management framework. On the other hand, input and output data staging and distribution elements of MDM system 4 may require efficient data transfer and throughput. While many systems have attempted to provide a compromise architecture to handle all such needs, MDM system 4 is preferably structured so that each element is designed to optimally accomplish its corresponding functions.

MDM system 4 may provide value for enterprises in various industry settings, such as retailing, manufacturing, or other industry settings. Although retail examples may be provided for purposes of illustration, the present invention contemplates MDM system 4 being used in connection with, and being tailored to, any suitable enterprise. The MDM architecture and design are preferably constructed to provide elements suitable to allow for successful deployment of MDM system 4 across multiple industry types and multiple enterprises within a particular industry type.

A. Process Layer

As described above, MDM system 4 includes a process layer 12 that provides the context for implementing and wholly or partially automating business configuration processes 14. In general, processes 14 provide functions necessary to realize process workflows provided as part of the MDM solution, providing structure to enterprise activities and enabling those activities to be repeated, controlled, monitored, and improved over time. Each process 14 represents a sequence of tasks that together accomplish a business activity. MDM system 4 may provide native support for generic processes 14 and support specific to particular processes 14. In one embodiment, processes 14 allow rich business workflows to be embedded within MDM system 4 and supported using the resources within underlying service and data layers 16 and 20, respectively. In one embodiment, MDM system 4 provides a highly configurable, flexible, and extensible environment for implementing and wholly or partially automating any suitable processes 14.

Processes 14 may operate at two levels. The first level, the enterprise level, may include larger scale intra-enterprise and inter-enterprise processes 14 associated with management of data as it relates to the targeted goals of the MDM solution. For example, where MDM system 4 is associated with a retail enterprise, an example of a first level process 14 may be a new item introduction process 14 involving storage of externally generated data concerning a new item into the core MDM reference data repository. The second level may include smaller scale management processes 14 involving movement of data internal to MDM system 4, such as retrieval of data from the core MDM reference data repository in accordance with queries from user interface, analytics, or other services internal to MDM system 4.

For example, generic processes 14 that may apply to any enterprise and any dimension of MDM system 4 may include, without limitation: (1) new entity introduction; (2) entity maintenance; (3) metadata realignment; (4) entity extraction; and (5) entity replication.

1. New Entity Introduction

This process 14 represents the introduction of a new entity into MDM system 4. For an example retail enterprise, this may include introducing a new item, location, vendor, or customer. The process 14 may be initiated by the enterprise associated with MDM system 4 or by any other enterprise, such as a vendor of a new item being introduced. A vendor providing a new item may be considered an example of content exchange. In any case, the retail enterprise associated with MDM system 4 must add enterprise specific data to MDM system 4 for the new item, validate the data, approve use of the new item, and publish the new item as available for use by planning, execution, monitoring, or other enterprise solution components 6, possibly through replication. An example new item introduction process 14 is described more fully below with reference to FIG. 10.

2. Entity Maintenance

This process 14 involves updating one or more characteristics of an existing entity, such as an item, location, vendor, or customer for an example retail enterprise. The process 14 may be initiated by the enterprise associated with MDM system 4 or by any other enterprise, such as a vendor of an item for which one or more characteristics are to be updated. For example, an "improved" item may effectively retain its original part number and Stock Keeping Unit (SKU) but have one or more of its primary attributes altered by the vendor, such as its size, weight, or color. Similarly, the retail enterprise might alter one or more secondary attributes of an existing item.

3. Metadata Realignment

This process 14 involves movement within a dimension of one or more members of one level relationship to another level relationship in a dimensional hierarchy. For example, a retail enterprise might move an item from one class to another class, which would in turn require identification of the one or more members to alter and the target relationships. The process 14 may need to keep appropriate audit and journal trails may require one or more approval sub-processes.

4. Entity Extraction

This process 14 involves providing selection criteria for one or more entities, performing an appropriate query, and moving appropriate data or otherwise making the data available to the requesting role or subsystem.

5. Entity Replication

This process 14 involves systematic replication of data in MDM system 4 in whole or in part to other subsystems for internal use. Such replication may allow the data to be used in a more efficient fashion than through direct operational access to the core MDM reference data repository.

B. Service Layer

As described above, service layer 16 provides services 18 that provide functions enabling the construction of process tasks appropriate for processes 14. Each service 18 provides a useful unit of work or enables a process task in the context of MDM system 4. Services 18 are not processes 14; rather, a service 18 is more analogous to a task within a process 14 or an action in response to a request associated with a process 14, such as computing the value of a function associated with the service 18 or issuing a query to view, update, or delete information in the core MDM reference data repository. In one embodiment, services 18 within service layer 16 of MDM system 4 for an example retail enterprise may include, without limitation: (1) entity maintenance services 18a; (2) metadata maintenance services 18b; (3) parameter maintenance services 18c; (4) attribute/trait services 18d; (5) event (calendar) services 18e; (6) supply chain network services 18f; (7) sourcing services 18g; (8) activity based costing (ABC) services 18h; (9) contract services 18i; and (10) bill of materials (BOM) services 18j.

1. Entity Maintenance

Entity maintenance services 18a provide basic functions for navigating, accessing, filtering, and sorting entities within MDM system 4. For an example retail enterprise, items, locations, vendors, and customers may be types of entities that are managed within MDM system 4 and maintained using entity maintenance services 18a.

2. Metadata Maintenance

Metadata maintenance services 18b provide basic functions for the construction, management, and realignment of appropriate metadata. For example, such metadata may include metadata describing the enterprise as a whole, the structure of MDM system 4, the structures of the data staging areas of MDM system 4, and the relationships between the data staging areas and the core MDM reference data repository. Such functions may include the ability to create dimensions and to define hierarchies on the dimension spaces, where each hierarchy includes a number of levels each having a number of members. Such functions may also include maintenance with respect to dimensions, levels, and members, such as creation, modification, or deletion of such metadata elements.

3. Parameter Maintenance

Parameter maintenance services 18c provide basic functions for the maintenance, management, and distribution of enterprise solution component parameters (i.e. business rule parameters). One or more parameters may be, but are not required to be, specific to one or more particular enterprise solution components 6. Each parameter may be tied to one or more entities and, as such, may be viewed as a secondary attribute of the entities (as opposed to a primary attribute such as size, weight, and color of an example item). Parameter maintenance services 18c provide functions particularly appropriate for these types of attributes. MDM system 4 may not only provide storage for such attributes and enable retrieval of such attributes for use, but may also provide a standardized management paradigm for all parameters in the overall enterprise solution. In one embodiment, this has the beneficial effect of providing a uniform methodology for parameter management and relieves point solution components from providing such functionality.

4. Attribute/Trait Services

Some attributes of entities are quantitative, well-defined, and stable over time. Examples of such attributes might include the size, weight, and color of an item or the address of a vendor. Other types of attributes are more qualitative, not as well-defined, and may change over time. These attributes, which may be referred to as traits, are often useful for customer-centric marketing and serve as the basis for attribute/trait cluster generation. Attribute/Trait services 18d provide functions appropriate for this type of data residing within or managed using MDM system 4. Since the number, and even the types, of such attributes/traits are typically not known a priori, the requirements for the physical structure of a system to handle this type of data are somewhat different than for more static master data. Attribute/Trait services 18d provide basic functions for creating, maintaining, and using this type of data and may also include more sophisticated services such as attribute/trait clustering services.

5. Event (Calendar) Services

Event, or more generally calendar, services 18e deal with management of time-related activities. These services 18e provide basic functions for establishing reference calendars and for creating and managing time-related activities (i.e. events with respect to established calendars).

6. Supply Chain Network Services

Supply chain network services 18f provide basic functions for supporting the definition and use of the physical supply chain network associated with an enterprise. The supply chain network is crucial to many planning, execution, monitoring, and other enterprise solution components 6 supported using MDM system 4.

7. Sourcing Services

Sourcing services 18g provide basic functions for accessing and using elements of the MDM model that are relevant to sourcing solution components, such as a supplier relationship management solution component.

8. Activity Based Costing (ABC) Services

A number of useful measures may be associated with entities, such as items where MDM system 4 is associated with an example retail enterprise, that traditionally have not been associated with an item catalog or similar construct. These measures may enable useful advanced analysis. One example is cost and price data associated with items. Such data may be used for advanced pricing optimization and ABC analyses. In one embodiment, MDM system 4 provides models to capture cost data, such as cost elements that when aggregated represent the total landed cost of goods. Included in these models are costs associated with activities such as handling an item as it passes through points in the associated supply chain network. ABC services 18h provide basic functions for handling ABC data stored within and managed using MDM system 4. Moreover, data such as normalized demand profiles (or associations to such profiles) are examples of secondary attributes that MDM system 4 may need to be accommodate.

9. Contract Services

In one embodiment, MDM system 4 does not inherently create or manage contracts for an example retail enterprise. However, MDM system 4 preferably provides a repository for contract data as it relates to entities stored within MDM system 4 and provides a centralized distribution mechanism for contract data to appropriate enterprise solution components 6. Contract services 18i provide basic functions for inputting, associating, and distributing contract-related data related to core enterprise data residing within MDM system 4.

10. Bill of Materials (BOM) Services

For an example retail enterprise, BOM services 18j provide basic functions for creating, managing, and visualizing BOMs for the enterprise. For example, a single actual BOM may be too atomic for planning purposes, such that suitable aggregation of one or more actual BOMs into a representation appropriate for planning may be required to support a planning system associated with MDM system 4. MDM system 4 may store such representations as reference data and make them available to planning or other external operational systems as needed. MDM system 4 may also automatically generate such representations, based on an MDM BOM model, to reduce or eliminate the need for manual evaluation and aggregation of individual actual BOMs to order to create such representations. BOM services 18*j* preferably support the elements of any appropriate MDM BOM model.

C. Data Layer

MDM system 4 is fundamentally concerned with the ability to create, manipulate, and extract data associated with the enterprise solution. As described above, data layer 20 provides the base data models and physical representations for storing various types of enterprise reference data 22 for retrieval and use in connection with processes 14 and associated services 18. In one embodiment, reference data 22 within data layer 20 of MDM system 4 for an example retail enterprise may include, without limitation: (1) master data 22*a*; (2) metadata 22*b*; (3) enterprise models 22*c*; (4) parameter data 22*d*; (5) attribute/trait data 22*e*; (6) event (calendar) data 22*f*; (7) supply chain network data 22*g*; and (8) ABC data 22*h*.

1. Master Data

Master data 22*a* represents core configuration data associated with entities, such as items, locations, vendors, and customers for an example retail enterprise. Many aspects of value chain management generally, and most planning, execution, monitoring, or other enterprise solution components 6 in particular, require reference data 22 regarding what items are sold, what locations sell the items, what vendors supply the items, what customers purchase the items, and other fundamental data elements on which all other enterprise data is built or to which all other enterprise data relates in some manner. MDM system 4 may extend the traditional concept of master data with respect to such entities to accommodate complex business workflows envisioned for an enterprise solution. Although legacy masters, for example item masters, may capture attributes of items such as SKUs that indicate where the items fit into the hierarchical structure of the enterprise data, there is no guarantee that a legacy system could manipulate or even view such data in a dimensional sense. In one embodiment, an item or other master for MDM system 4 is able to create, manipulate, navigate, view, and extract data in a dimensional way.

In one embodiment, an entity within a master data type represents an atomic member of that type, such as a particular item, a particular location, a particular vendor, or a particular customer. Attributes of entities such as items, locations, and the like may have important roles with respect to planning, execution, monitoring, and other enterprise solution components 6. A first type of entity attribute is a physical or primary attribute generally associated with inherent characteristics of the entity, such as size, weight, and color for an example item entity. Primary attributes may be very important, for example, in planning product assortments or solving logistics problems associated with shipping an order for an item. Primary attributes are reasonably static and require no other context for meaning than the associated entity itself. A second type of entity attribute exists as a consequence of the use of the entity within the enterprise, which may result in a defined relationship of the entity to another entity or to an external metric. An example of such as attribute of an item might be the category or sub-category within the enterprise to which the item is assigned. This type of attribute, often referred to as a qualitative or secondary attribute, may be very important for more advanced analytic techniques such as item grouping/clustering, customer focused marketing, and promotions. In one embodiment, master data 22*a* allows MDM system 4 to manage both primary and secondary attributes of entities.

It may be important to distinguish between data considered to be master data 22*a* and data considered to be attribute/trait reference data 22*e* described below. As discussed above, master data 22*a* may be reasonably static and may not change rapidly over time. For example, a color (primary attribute) of a particular shirt may not change within a season the shirt is sold. Although the sub-category within the enterprise to which the shirt is assigned (secondary attribute) may change, as a result of a realignment for example, such changes will likely be infrequent. In contrast, for example, attributes/trait data 22*e* may be heavily used for targeted assortment and hence must capture dynamic behaviors of customers. In addition, attributes/traits may themselves change, with new attributes/traits being added as appropriate and existing attributes/traits which are no longer valid being dropped as appropriate.

2. Metadata

Another form of reference data 22 that is inherent to the entity masters described above and is very important to many enterprise solution components 6 is enterprise metadata 22*b*. In general, metadata 22*b* is data describing other data. In the context of MDM system 4, metadata 22*b* describes the structure of the data stored in and managed using MDM system 4. In general, metadata 22*b* provides a description of the structure of the dimensional view of master data 22*a*. This description focuses on what dimensions exist, what levels describe the dimension coordinates, and what members exist and are associated with the levels. In addition, navigation constructs referred to as hierarchies may be defined. For example, for an example retail enterprise, metadata 22*b* might include the various levels of the taxonomy of items and one or more hierarchies for navigating through the various levels of the taxonomy. In one embodiment, MDM system 4 captures metadata 22*b* in a form that can be effectively replicated to downstream enterprise solution components 6 that require consistency in the dimensional view of master data 22*a*. As described above in connection with metadata maintenance services 18*b*, MDM system 4 may manage the creation, manipulation, and deletion of metadata 22*b* and provide for realignment of master data 22*a* (e.g. moving an item from a first category to a second category) such that any realignment is properly reflected in metadata 22*b*.

3. Enterprise Models

Enterprise models 22*c* represent organizational views of the roles within an enterprise. In one embodiment, enterprise models 22*c* may extend beyond the enterprise boundary to cover all organizational elements of the value chain associated with the enterprise. Enterprise models 22*c* may be important with respect to authentication and authorization aspects of data access. Additionally, enterprise models 22*c* may provide for approval chain relationships important to business process management.

Figure 3:
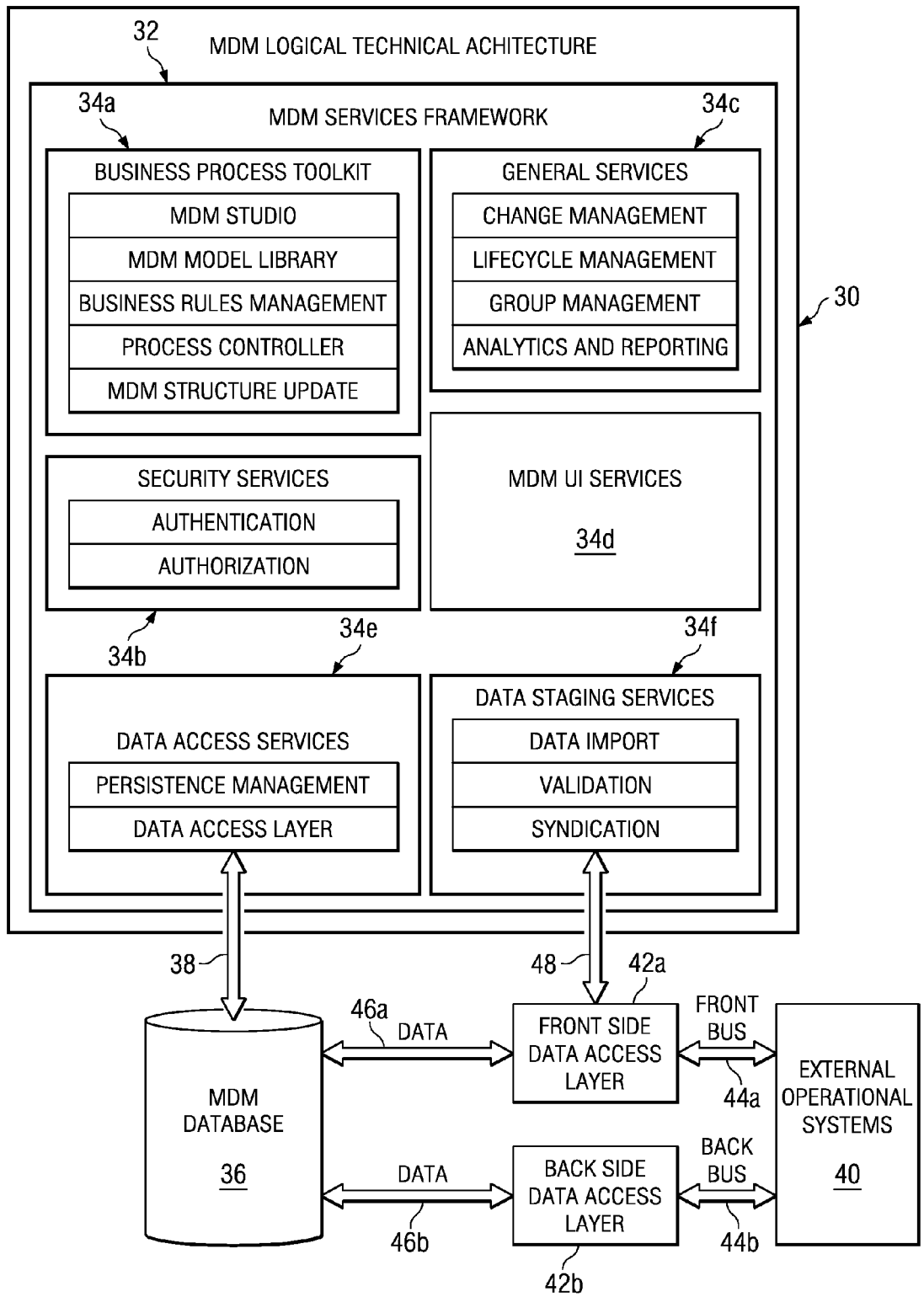
FIG. 3 illustrates an example high level logical technical architecture for an MDM system.

4. Parameter Data
5. Attribute/Trait Data
6. Event (Calendar) Data
7. Supply Chain Network Data
8. Activity Based Costing (ABC) Data III. MDM Logical Technical Architecture FIG. 3 illustrates an example high level logical technical architecture 30 for MDM system 4. In general, logical technical architecture 30 represents a technology-centric view of MDM system 4 and specifies logical elements of MDM system 4 that together may operate to provide the desired MDM solution. In one embodiment, logical technical architecture 30 includes an MDM services framework 32 containing core MDM services 34. MDM database 36 includes the core MDM reference data repository. Certain services 34 may be applied to any classes of reference data 22 to be modeled within the core MDM reference data repository. Other services 34 may be tailored to particular classes of reference data 22 modeled within the core MDM reference data repository. Other services 34 may generically support various security, data access, data staging, and other data management needs. Example services 34 are described more fully below. Appropriate services 34 may access database 36 using one or more appropriate data access links 38.

External operational systems 40 may access database 36 using one or more data access layers 42. In one embodiment, an external operational system 40 may access database 36 in connection with a business workflow using a "front side" data access layer 42a, an associated "front" bus 44a between external operational system 40 and front side data access layer 42a, and an associated data interface 46a between front side data access layer 42a and database 36. Front side data access layer 42a is typically used to pass control data from external operational systems 40 to MDM system 4 for controlling MDM operations and may be associated with application integration. One or more services 34 may access front-side data access layer 42a using one or more suitable data access links 48. An external operational system 40 may access database 36 using a "back side" data access layer 42b, an associated "back" bus 44b between external operational system 40 and back side data access layer 42b, and an associated data interface 46b between back side data access layer 42b and database 36. Back side data access layer 42b is typically used for movement of reference data 22 to and from external operational systems 40 and may be associated with data integration. However, front side data access layer 42a may also be used to move reference data 22 to and from external operational systems 40 where appropriate, for example, where an external operational system 40 requires particular reference data 22 in a particular message-based or other format.

A. Logical Data Services Architecture

FIG. 4 illustrates an example high level logical data services architecture 50 for MDM system 4. In one embodiment, data services architecture 50 includes primary layers: (1) a "front side" data services layer 52a; (2) a physical data layer 54; and (3) a "back side" data services layer 52b. Front side data services layer 52a is associated with front side data access layer 42a, described above with reference to FIG. 3, and provides direct data access to internal MDM services 34 that directly access the core MDM reference data repository within database 36. For example, front side data services layer 52a may provide direct access to database 36 for internal analytics or user interface service queries. Physical data layer 54 includes database 36 in which the core MDM reference data model resides. Back side data services layer 52b is associated with back side data access layer 42b, described above with reference to FIG. 3, and provides indirect data access to external operational services 56 associated with external operational systems 40 that indirectly access the core MDM reference data repository within database 36. For example, back side data services layer 52b may provide operational services with indirect access to database 36 through staging areas of database 36, staging areas associated with external operational systems 40, and persistent data stores associated with external operational systems 40. In a physical deployment, each of the three primary layers of data services architecture 50 may be mapped to appropriate technology components.

Front side data services layer 52a may be mapped to an appropriate object-based services layer, such as Common Object Request Broker Architecture (CORBA) or JAVA 2 PLATFORM ENTERPRISE EDITION (J2EE), residing on an appropriate application server within an application server layer (described below with reference to FIG. 9). In certain embodiments, front side data services layer 52a may be more tightly coupled to physical data layer 54 due to the necessity of an object-to-relational translation layer as part of front side data services layer 52a.

Database 36 within physical data layer 54 may be implemented as a relational database. Database 36 may be modeled and managed in a number of ways, one of which may be selected for a particular deployment. In one embodiment, object relational database management technology may be used, although this approach is typically subject to performance risks. With this approach, the core MDM reference data model may be mapped to existing services 34 using a suitable object relational mapping layer. In an alternative embodiment, for improved performance or other reasons, a fixed data model relational database with a light access layer may be used. The light access layer would provide persistent objects tailored to the fixed and optimized physical schema of the relational database rather than driving the physical schema through an object relational mapping layer. With this approach, new services 34 may be mapped to an existing core MDM reference data model.

Although a single core MDM reference data repository within a single database 36 is primarily described herein for convenience, the present invention contemplates any number of core MDM reference data repositories within any number of databases 36 according to particular needs. However, all core MDM reference data repositories within all databases 36 are subject to centralized data management associated with a single MDM system 4 and preferably appear to both internal MDM services 34 and external operational services 56 as a single core MDM reference data repository.

Back side data services layer 52b is preferably optimized for potentially large data synchronization and replication operations, preferably incorporating net change techniques, efficient store procedure techniques, and an object-based control layer. Furthermore, since back side data services layer 52b maps to planning, execution, monitoring, or other enterprise solution components 6 for which data movements and associated mappings (i.e. transformations) must remain reasonably fixed over time, the core MDM reference data model should also be reasonably fixed over time.

B. Logical Data Repository Architecture

FIG. 5 illustrates an example high level logical architecture 70 of database 36. In one embodiment, database 36 incorporates a consistent dimensional modeling framework imposed on a model supporting a persistence management service, which is described more fully below. This preferably allows services framework 32 to manage reference data 22 within database 36 in a manner that is consistent with established dimensional views of reference data 22. Where MDM system 4 does not physically contain all reference data 22, reference data 22 that is not physically contained in MDM system 4 preferably appears as if it is physically contained in MDM system 4. Database 36 includes a managed data area 72 containing reference data 22, at least some of which may be managed remotely from MDM system 4. Managed data area 72 provides the core MDM reference data repository for reference data 22. Database 36 may also include a cached data area 74 containing cached data 76 representing reference data 22 that has been extracted from managed data area 72, processed according to the needs of one or more elements of MDM system 4 using a data management framework 78, and is re-inserted in managed data area 72 as reference data 22 once processing is complete. For example, data management framework 78 may provide the process controller within business process toolkit 34a, user interface services 34d, or any other suitable element of MDM system 4 with operational access to cached data 76.

Reference data 22 stored within MDM system 4 has an assigned state consistent with its use. In one embodiment, in association with data management framework 78, cached data area 74 provides a mechanism to hold a copy of reference data 22 for manipulation while the state of reference data 22 in managed data area 72 is maintained as locked for read only access until the manipulation process has completed. Once a copy of reference data 22 is being held as cached data 76 within cached data area 74 during the manipulation process, the manipulation process sees only the state of cached data 76 within cached data area 74, while other processes, services, and systems associated with MDM system 4 see the true state of reference data 22 within managed data area 72 rather than an intermediate state reflecting the still incomplete manipulation process.

Database 36 may also include an operational access area 80 providing one or more external operational systems 40 with access to reference data 22 within managed data area 72. Where MDM system 4 is associated with an example retail enterprise, external operational systems 40 may include external enterprises such as manufacturers, distributors, and vendors of items associated with enterprise. External operational systems 40 may also include planning, execution, monitoring, and other enterprise solution components 6 within the enterprise but external to MDM system 4. Operational access area 80 may containing a master copy 82 of an Lightweight Directory Access Protocol (LDAP) repository used to provide authentication and authorization services as described more fully below. Operational access area 80 may also contain inbound and outbound staging areas 66 and 68, respectively, for data that is inbound from and outbound to, respectively, external operational systems 40.

C. Information Sharing Architecture

Figure 6:
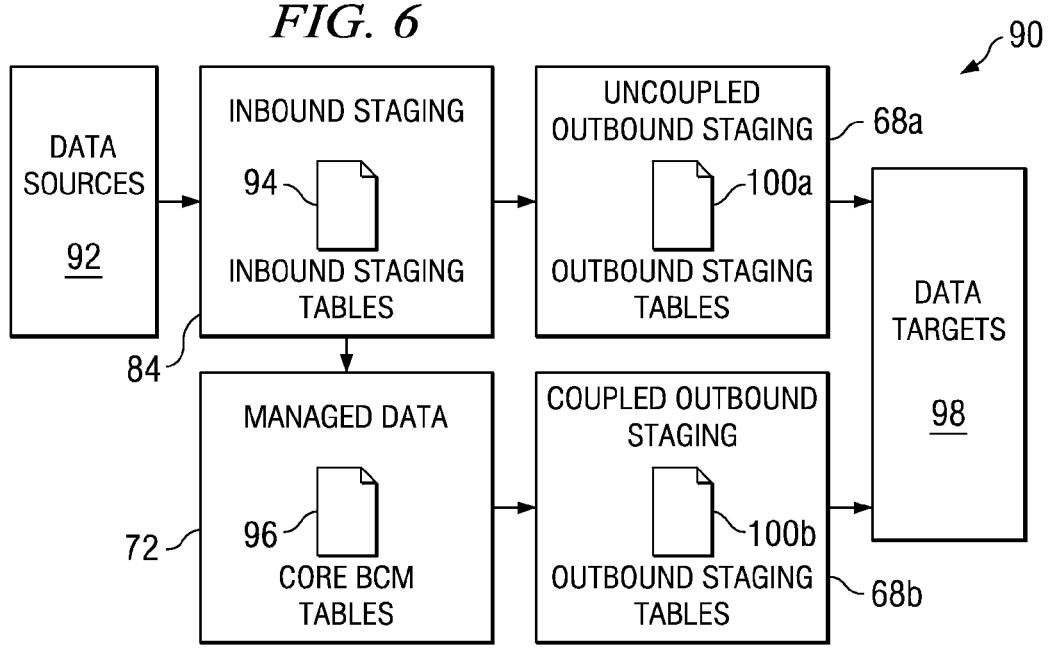
FIG. 6 illustrates an example information sharing architecture for an MDM system.

In one embodiment, data may enter MDM system 4 from any appropriate source and may leave MDM system 4 for any appropriate target. Unless reference data 22 stored within the core MDM reference data repository can be readily made available to external operational systems 40, storing reference data 22 within the core MDM reference data repository may provide little value to the enterprise. Conversely, there may be other data residing within portions of the enterprise that needs to be distributed to other portions of the enterprise through MDM system 4. FIG. 6 illustrates an example information sharing architecture 90 for MDM system 4. In one embodiment, database 36 may be optimized for management of reference data 22 rather than for speed of data input or data output. Accordingly, a staging strategy may be employed to minimize data transfer times to and from external operational systems 40.

As described above, inbound data may be received—from one or more data sources 92 for storage in the core MDM reference data repository of managed data area 72. Data sources 92 may include persistent data stores associated with external enterprises 40a, such as manufacturers, distributors, vendors, and customers where MDM system 4 is associated with an example retail enterprise. Data sources 92 may also include operational staging data stores associated with planning, execution, monitoring, or other enterprise solution components 6. The inbound data is first moved into inbound staging tables 94 of inbound staging area 84, then into core MDM tables 96 within the core MDM reference data repository of managed data area 72 as reference data 22. Data cleansing, validation, transformation, or other processing may occur, where appropriate, during the movement of data from inbound staging area 84 to the core MDM reference data repository managed data area 72. For example, it may be very important that reference data 22 stored within the core MDM reference data repository and made available to external operations systems 40 is considered clean, such data cleansing in connection with loading of inbound data.

As described above, outbound data may be provided to one or more data targets 98, such as persistent data stores associated with external enterprises 40a or operational staging data stores associated with planning, execution, monitoring, or other external enterprise solution components 6. Outbound data being distributed using MDM system 4 without being stored in the core MDM reference data repository may be sent from inbound staging tables 94 of inbound staging area 84 to outbound staging tables 100a of uncoupled outbound staging area 86a, then out to data targets 98. Similarly, outbound reference data 22 in the core MDM reference data repository of managed data area 72 may be moved out of core MDM tables 96 of managed data area 72 to outbound staging tables 100b of coupled outbound staging area 86b, then out to data targets 98. Reference data 22 stored within core MDM tables 96 may be substantially continuously synchronized with the outbound data in outbound staging tables 100, such that at any point in time an accurate snapshot of reference data 22 is available within outbound staging area 86. Synchronization of reference data with operational data may be important, for example, to help ensure that planning based upon operational data is not performed for an entity that no longer exists within the enterprise as reflected in reference data 22. Data transformation or other processing may occur, where appropriate, during the movement of reference data 22 from the core MDM reference data repository of managed data area 72 to outbound staging area 86.

D. MDM Services Framework

Referring again to FIG. 3, in one embodiment, services framework 32 may provide services 34 organized into the following groups, without limitation: (1) business process toolkit 34a, (2) security services 34b, (3) general services 34c, (4) user interface services 34d, (5) data access services 34e, and (6) data staging services 34f.

1. Business Process Toolkit

Business process toolkit 34a may be provided using a corresponding subsystem within services framework 32 that provides for management of MDM models, processes, and associated business rules. Automated processes associated with this subsystem may be used to implement model changes associated with physical deployment of MDM system 4. In one embodiment, business process toolkit 34a may include, without limitation: (1) an MDM studio, (2) an MDM model library, (3) a business rules management service, (4) a process controller, and (5) an MDM structure update service.

a. MDM Studio, Model Library, and Data Thesaurus

Figure 7:
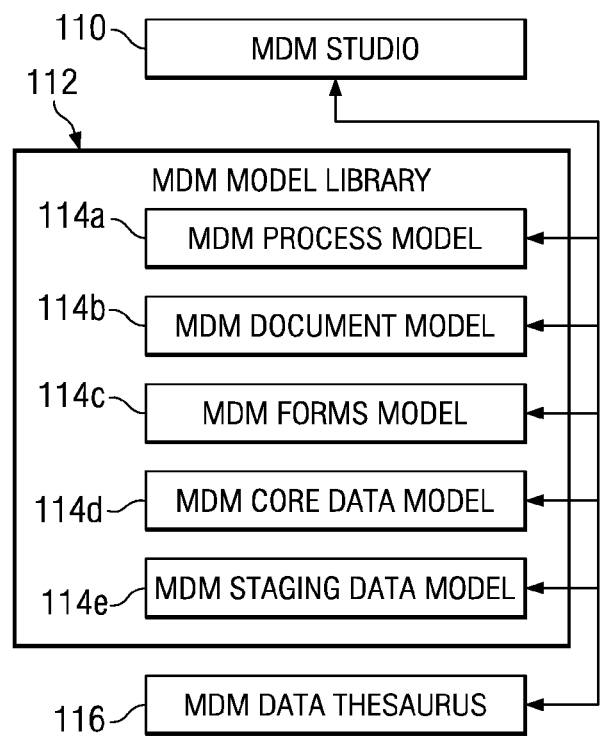
FIG. 7 illustrates an example MDM studio and an associated MDM model library.

FIG. 7 illustrates an example MDM studio 110, associated MDM model library 112 containing one or more MDM models 114 appropriate for MDM system 4, and associated MDM data thesaurus 116.

MDM studio 110 may provide services to model the structure of MDM system 4 and its components, for example, for purposes of constructing MDM system 4 or for purposes of extending or otherwise updating MDM system 4. MDM studio 110 may provide support for one or more graphical modeling user interfaces. Modeling of MDM system 4 may include, for example, modeling structural aspects of the core MDM reference data repository within managed data area 72 of database 36, modeling the structure of staging areas 66 and 68 of database 36, and modeling appropriate process workflows. MDM studio 110 may provide support both for initial construction of MDM models 114 and later extension or other updating of MDM models 114. In one embodiment, MDM models 114 include, without limitation: (1) MDM process model 114a, (2) MDM document model 114b, (3) MDM forms model 114c, (4) MDM reference data model 114d, and (5) MDM staging data model 114e.

(1) MDM Process Model

Process models 114a describe the processes 14 to be used for managing reference data 22 stored within the core MDM reference data repository within database 36. In one embodiment, for a particular process 14, the corresponding process model 114a describes the flow of tasks to be performed on reference data 22 in connection with process 14, particular services 18 associated with these tasks, and one or more particular process engines responsible for execution of process 14. For service oriented tasks, descriptions may utilize Web Services Description Language (WSDL) protocols. Each process 14 may represent one or more user interface task flows, enterprise solution component task flows, inter-enterprise process flows, or any other appropriate processes or task flows. Process model 114a may specify allocation of each process 14 to a process controller, user interface controller, or enterprise-level workflow controller. Process model 114a may also provide for graphical or other simulation of processes 14.

(2) MDM Document Model

Document model 114b provides the metadata for MDM documents that are utilized in connection with processes 14. In one embodiment, MDM documents represent external cached representations of specific metadata elements within the underlying reference data model 114d.

(3) MDM Forms Model

Forms model 114c provides metadata describing forms associated with objects within reference data model 114d. Forms may be important for efficient extraction of metadata elements from reference data model 114d and may be analogous to database views.

(4) MDM Reference Data Model

Reference data model 114d represents the metadata describing reference data 22 stored within the core MDM reference data repository. This is the lowest level metadata representation contained within model library 112. In one embodiment, reference data model 114d may be an enterprise meta-model in Extensible Markup Language (XML) Software Description (XSD) format, which may separate instance data from metadata in a manner desirable for management and which back side data access layer 42b may read directly from model library 112. It may be important to synchronize changes to reference data model 114d with any higher level constructs, such as forms model 114c or document model 114b. Synchronization of models 114 may be automatic or, if appropriate, studio 110 may flag the need for changes and direct an administrative user to assist in synchronizing models 114.

A generic reference data model for reference data 22 to be stored within the core MDM reference data repository may be constructed to represent a synthesis of all applicable data elements, such as all data elements associated with enterprises in the retail industry for example, and may be viewed as a superset of reference data models 114d to be used in actual deployments of MDM system 4. The generic reference data model, and all reference data models 114d ultimately derived from the generic reference data model, should be constructed for consistency and efficient management of reference data 22. In one embodiment, the generic reference data model may be captured as a document in an annotated RATIONAL ROSE object model.

(5) MDM Staging Data Model

Staging data model 114e represents metadata describing the structure of inbound and outbound staging tables 94 and 78, respectively, and also the mapping between reference data model 114d and the staging table representation of the data within inbound and outbound staging tables 94 and 78, respectively. Reference data model 114d may be a normalized data model derived from a generic reference data model as described above. However, inbound data may reflect arbitrary schema that are inconsistent with reference data model 114d. For inbound data, appropriate mappings (i.e. transformations) of reference data model 114d to source data models, such as an inbound staging data model 114e representing an arbitrary input data format for an external operational system 40, may be performed as inbound data is being stored in the core MDM reference data repository. Similarly, outbound data may need to be de-normalized for consumption as operational data. For outbound data, appropriate mappings (i.e. transformations) of reference data model 114d to target data models, such as an outbound staging data model 114e representing a flat output data format for an external operational system 40, may be performed as reference data is being moved out of the core MDM reference data repository.

MDM studio 110 may provide services to create, update, and display MDM data thesaurus 116. In one embodiment, MDM system 4 may be used to manage reference data 22 and support data integration across multiple enterprise solution components 6 representing heterogeneous software environments involving different reference data models 114d and associated schemas. Data thesaurus 116 preferably allows MDM system 4 to accommodate such multiple heterogeneous enterprise solution components 6 and associated models 114d in a manner that allows a user to define and view the relationships between fields in different schemas or between fields in different domains within a particular schema according to particular needs.

Figure 8:
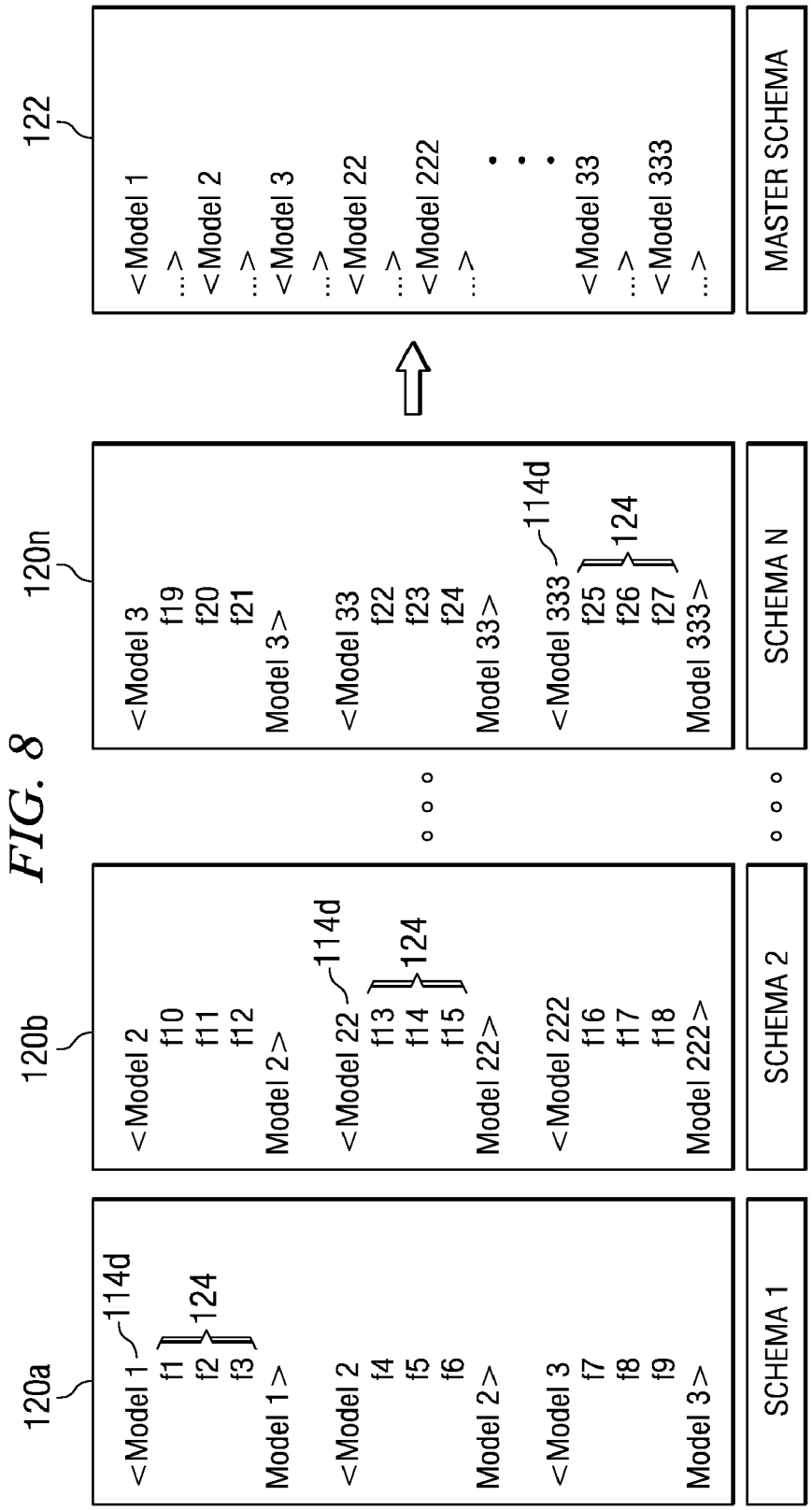
FIG. 8 illustrates an example of schemas for reference data stored in an MDM system.

FIG. 8 illustrates an example of schemas for reference data 22 stored in MDM system 4. In one embodiment, MDM system 4 supports multiple schemas 120, each schema 120 including one or more reference data models 114d that may or may not relate to one another. Each model 114d includes one or more fields 124, where a particular field 124 may belong to one or more models 114d within a particular schema 120. A particular subset of fields 124 within a model 114d may represent a sub-model of model 114d. Depending on their associated fields 124, models 114d may define physical business entities (e.g., items, locations, vendors, customers, BOMs, etc.), logical business relationships (e.g., items to locations, items to vendors, locations to vendors, etc.), business parameters (e.g., inventory parameters, logistics information, calendars, etc.), or any other appropriate information. In one embodiment, master schema 122 is the union of all models 114d within schemas 120 needed for operation of MDM system 4 with respect to its management of reference data 22 and interaction with enterprise solution components 6. Master schema 122 provides a common or other master reference data model across all models 114d according to suitable mappings between the master reference data model and models 114d. For example, where MDM system 4 is used to manage reference data 22 across heterogeneous enterprise solution components 6 with different models 114d, master schema 122 provides a master reference data model encompassing all such models 114d.

A model 114d may be extended in a number of ways within the context of a particular schema 120. As illustrated in FIG. 9A, in a first example method a base model 114d is extended by adding new extension fields 124 to base fields 124 already present in base model 114d, through a user interface associated with MDM studio 110 for example. In this method, the base model 114d, existing physical table structures associated with base model 114d, and existing user interface workflows that depend on base model 114d are preserved. All fields 124, including base fields 124 and new extension fields 124, are presented to the user through the existing user interface workflows. Alternatively, as illustrated in FIG. 9B, in a second method a base model 114d is extended by creating a new extended model 114d that inherits all base fields 124 from base model 114d. In this method, the existing physical table structures and user interface workflows for the base model 114d are not preserved. Instead, a new physical table with the name of the new extended model 114d will be created in the physical instantiation of the new extended model 114d. The present invention contemplates extending a model 114d in any manner. Extension of models 114d within MDM system 4 may be limited to particular roles within an associated enterprise where appropriate.

FIG. 10 illustrates example data dictionaries for the schemas within MDM system 4. A list of all fields 124 within a schema 120 defines a data dictionary 126 for schema 120. In one embodiment, a master data dictionary 128 for MDM system 4 includes a list of all fields 124 for all models 114d within master schema 122. Master data dictionary 128 may be displayed alphabetically by field 124. In this case, for each field 124, a list of models 114d in which field 124 is used is displayed alphabetically by model name under, alongside, or otherwise in association with field 124, where a model 114d may appear in the model lists for multiple fields 124. Alternatively, master data dictionary 128 may be displayed alphabetically by model name. In this case, for each model 114d, a list of fields 124 within model 114d may be displayed alphabetically under, alongside, or otherwise in association with model 114d, where a field 124 may appear in the field lists for multiple models 114d.

When a new model 114d is added within MDM system 4, master data dictionary 128 may be used as the basis for creating the new model 114d. If one or more new fields 124 are needed for the new model 114d that do not currently exist in master data dictionary 128, then in one method master data dictionary 128 is first updated with the new fields 124 and the new model 114d is then created based on the updated master data dictionary 128. In another method, the new model 114d is first created including the new fields 124 and an updated master data dictionary 128 is then automatically generated accordingly. The present invention contemplates synchronizing master data dictionary 128 with all models 122 and their associated fields 124 in any suitable manner according to particular needs.

Figure 11:
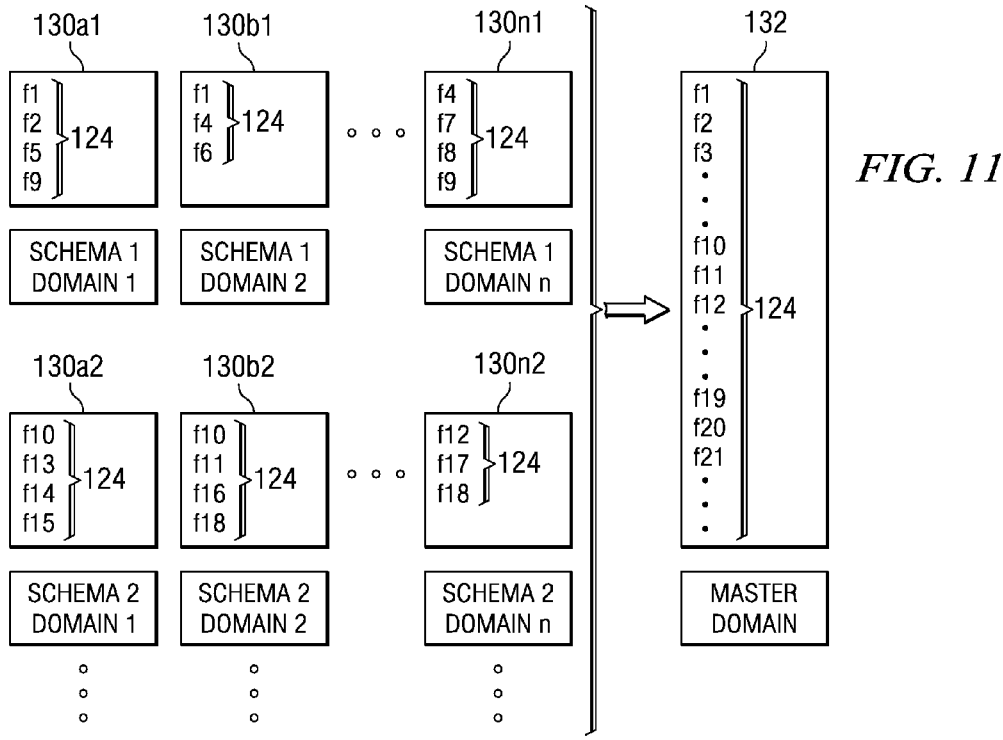
FIG. 11 illustrates example domains for schemas within an MDM system.

FIG. 11 illustrates example domains for the schemas within MDM system 4. One or more domains 130 may be associated with a schema 120. Domains 130 may define business functions (e.g., supply chain management, customer partner management, revenue optimization, etc.), industries (e.g., High-Tech, Semiconductor, Retail, etc.), companies (e.g., Celestica, Philips, Best Buy, etc.), or any other suitable information. Each domain 130 includes one or more fields 124, where a particular field 124 may belong to one or more domains 130 within a particular schema 120. A particular subset of fields 124 within a domain 130 may represent a sub-domain of domain 130. In one embodiment, a master domain 132 may encompass the union of all domains 130 and thus the union of all models 114d and their associated fields 124 across all schemas 120 within MDM system 4. Domains 130 may be specified at the data dictionary level rather than the model level. For example, a field 124 in an Item model 114d may have a logical name item_id in a first domain 130 and a logical name part_id in a second domain 130. Within a schema 120, models 114d may be associated with domains 130 such that the elimination of a particular domain 130 will also eliminate all associated fields 124 (i.e. fields 124 for all models 114d or sub-models associated with the particular domain 130) from schema 120.

In one embodiment, all fields 124 entered using MDM studio 110 belong to master domain 132 by default. A number of possible workflows exist for assigning fields 124 to particular domains 130. For example, in a first use case, the user may add new fields 124 to extend an existing model 114d, the new fields 124 may be automatically or otherwise added to data dictionary 126 for schema 120 associated with model 114d, and the user may set the particular domain 130 for each new field 124. The new fields 124 may be assigned as a group where appropriate. As another example, in a second use case, the user may create a new model 114d including new fields 124, the new fields 124 may be automatically or otherwise added to data dictionary 126 for schema 120 associated with the new model 114d, and the user may set the particular domain 130 for each new field 124. The new fields 124 may be assigned as a group where appropriate. As another example, in a third use case, a user may enter a domain name for the particular domain 130, add the new fields 124 to data dictionary 126 for schema 120 associated with the particular domain 130, create a new model 114d using data dictionary 126, and automatically or otherwise add the new fields 124 to the new model 114d. The present invention contemplates assigning fields 124 to particular domains 130 in any suitable manner.

Figure 12:
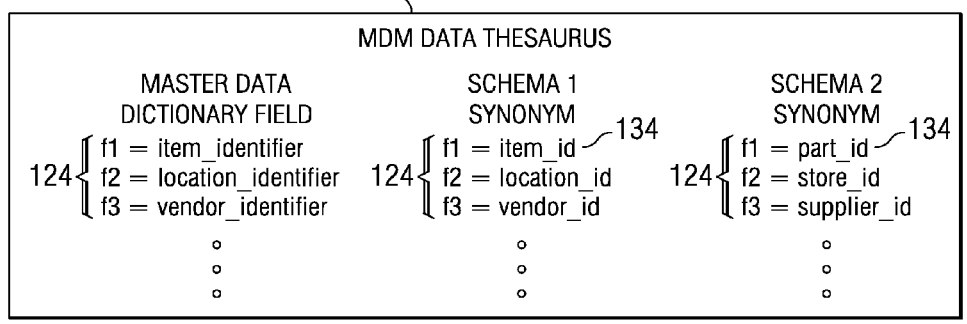
FIG. 12 illustrates an example data thesaurus providing mappings and associated synonyms across multiple schemas within an MDM system.

FIG. 12 illustrates an example data thesaurus 116 providing mappings and associated synonyms across multiple, preferably all, schemas 120. For example, differing SAP and Siebel schemas 120 may exist, with certain mappings between the two schemas 120. In one embodiment, MDM system 4 may load the two schemas 120 into MDM studio 110 and create, for each field 124 within master data dictionary 128 for master schema 122, a set of synonyms 134 for the corresponding fields 124 in the two schemas 120. Providing master data dictionary 128 and data thesaurus 116, with its mappings and associated synonyms 134 between master data dictionary 128 and data dictionaries 126 for other schemas 120, preferably allows any suitable heterogeneous enterprise solution components 6 and associated external operational systems 40 to be readily accommodated and integrated into system 2.

Data thesaurus 116 may be displayed to a user with respect to master schema 122. In this case, data thesaurus 116 may be displayed showing all fields 124 in master data dictionary 128 for master schema 122 and the corresponding synonyms 134 in one, some, or all schemas 120, such as the SAP and Siebel schemas 120 for example. Instead or in addition, data thesaurus 116 may be displayed to a user with respect to some or all schemas 120 without master schema 122. In this case, one of the schemas 120 (e.g., the SAP schema 120) may be designated the root schema 120, either by default or according to user input. Data thesaurus 116 may be displayed showing all fields 124 in data dictionary 126 for the root schema 120 and their corresponding synonyms 134 in one, some, or all other schemas 120 (e.g., the Siebel schema 120). Although synonyms 134 and associated mappings for two schemas 120 are illustrated in FIG. 12 as an example, the present invention contemplates data thesaurus 116 including synonyms 134 for any number of schemas 120.

Figure 13:
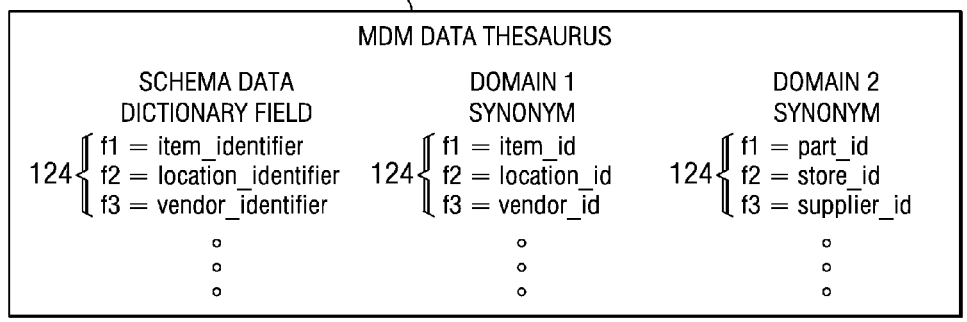
FIG. 13 illustrates an example data thesaurus providing mappings and associated synonyms across multiple domains within a schema within an MDM system.

FIG. 13 illustrates an example data thesaurus 116 providing mappings and associated synonyms 134 across multiple, preferably all, domains 130 in a schema 120. Data thesaurus 116 may provide such mappings and associated synonyms 134 instead of or in addition to those described above with reference to FIG. 12. As illustrated in FIG. 13, fields 124 within data dictionary 126 for schema 120 may be referred to using a different logical name in each domain 130. For example, an item_identifier field in data dictionary 126 may be referred to as item_id in a first domain 130 and part_id in a second domain 130. In one embodiment, data thesaurus 116 may be displayed with respect to a root domain 130 designated by default or according to user input. As an example, a user may enter the name of a domain 130 for which data thesaurus 116 is desired. This may be designated the root domain 130. The user may then enter the list of one or more domains 130 for which synonyms 134 are desired. In response to this user input, for each field 124 of the root domain 130, synonyms 134 for the one, some, or all other domains 130 associated with schema 120 may be displayed.

b. Business Rules Management Service

Referring again to FIG. 3, the business rules management service may provide for creation and maintenance of business rule elements associated with services 18, such as import validation rules, staging transformation rules, and general consistency rules associated with MDM system 4. The business rules management service may provide for run-time-script-based rules or for association of design-time rules objects with MDM process workflows.

c. Process Controller

The process controller may represent a run-time process workflow controller for MDM system 4. As described above, process model 114a may specify allocation of one or more processes 14 to the process controller, a user interface controller, or an enterprise-level workflow controller. In one embodiment, the process controller operates in cooperation with any such user interface controller and any such enterprise-level workflow controller.

d. MDM Structure Update Service

In one embodiment, MDM system 4 provides a mechanism to model its structure and a mechanism to automate a process to realize an extension of that model in a physical deployment. The structure update service may provide for automated implementation of a model 114 that is created or changed during the modeling process. The structure update service may be particularly important with respect to the structure of inbound and outbound staging areas 66 and 68, respectively. It may be necessary to initially specify staging data model 114e, the reference model to staging area structure. In addition, it may be necessary to generate appropriate Structured Query Language (SQL) or changes to SQL to maintain the state of staging areas 66 and 68 relative to staging data model 114e. Without automation of these tasks using the structure update service, maintaining coordination of various elements of MDM system 4 would be a very intensive manual task. The structure update service may also provide for updating staging data model 114e and other models 114, along with associated SQL, in response to updates provided with enterprise solution components 6. Such structure updates may be driven according to update description script documents providing information necessary for the structure update to automatically execute.

2. Security Services

Naturally, only users with appropriate access should be permitted to view or manipulate reference data 22 within MDM system 4. Security services 34b may be provided using a corresponding subsystem within services framework 32 designed to fulfill two primary responsibilities. The first responsibility is to control access to MDM system 4 itself. The second responsibility is to manage the structure of the security model as applied to enterprise solution components 6. For this responsibility, services are provided to manage the security context that all enterprise solution components 6 will utilize, for example, through an LDAP repository whose master copy 82 resides within operational access area 80 of database 36. Security services 34b may include, without limitation: (1) authentication services, and (2) authorization services.

a. Authentication

Authentication services provide initial log-in security with respect to enterprise solution components 6. Authentication is preferably based on an organizational model for the enterprise to provide a single log-in security context for all enterprise solution components 6.

b. Authorization

Authorization services provide layered, granular access to specific services 18 or reference data 22 for an authenticated user. Authorization may be provided at two levels. The first level (Level 1) deals with access to enterprise solution components 6 represented by specific applications or high level groups of services 18. The second level (Level 2) deals with access to specific functions within an enterprise solution component 6. Field level authorization may be handled by particular enterprise solution components 6 themselves as appropriate. In the case of MDM system 4 itself, any required authorization above Level 2 (i.e. Level 3 and higher) may need to be provided within MDM system 4.

3. General Services

General services 34c may be provided using a corresponding subsystem within services framework 32 and may include, without limitation: (1) a change management service; (2) a lifecycle management service; (2) a group management service; and (4) an analytics and reporting service.

a. Change Management

The change management services provides an audit trail for changes made to MDM system 4. For example, information may be kept regarding who made a change, at what time the change was made, and perhaps the value that was changed. The audit trail for changes should preferably be implemented in such a fashion that the mechanism can be turned off for information not requiring change management or for changes prior to configuration control, such as changes associated with initial setup of data elements. Logical grouping of reference data 22 may be important for many data management aspects, such as retrieving reference data 22 and making changes to reference data 22. Therefore, in terms of granularity, in one embodiment change management is group-based with overrides at the group member level.

b. Lifecycle Management

As described above, reference data 22 stored within MDM system 4 has an assigned state consistent with its use. The lifecycle management service allows for defining a lifecycle that describes the possible states for data elements, as well as a mechanism for managing the movement of data from one lifecycle state to another.

c. Group Management

Given the vast scope and scale of data that may potentially reside within MDM system 4, it is preferable that the overall strategy for data management be based on logical groups of data rather than individual data elements. Logical grouping of reference data 22 may be important for many data management aspects, such as retrieving reference data 22 and making changes to reference data 22. Although single entities may be manipulated, many updates will typically occur with respect to groups of entities. In one embodiment, the group aspect of data manipulation is built in from the foundation of MDM system 4.

d. Analytics and Reporting

The health and status of a large data repository, such as the core MDM reference data repository within database 36, is critical. The analytics and reporting service provides knowledge concerning what reference data 22 is stored within the core MDM reference data repository and the state of various system elements of MDM system 4. Although the types of analysis and associated reports will be specific to MDM system 4, general analysis and reporting tools may be used where appropriate. Analytics may extend to a broad range of activities supported directly by this service or indirectly through management by this service. Analytics may include clustering services for attributes/traits, decision support activities relating to entity data stored within the core MDM reference data repository, management of parameter computation such as coordinating parameter computation using an external engine, updating parameters such as lead times for items at particular locations, and any other suitable analytics. Reports may include change log activity, history traces for specific entities or groups of entities, reports on production parameter sets including time-phased sets, calendar examination and reconciliation, reports on new entities (such as new items) entered into the core MDM reference data repository and dying entities (such as items) removed from the core MDM reference data repository, and any other suitable reports.

4. User Interface Services

5. Data Access Services

Data access services 34e may be provided using a corresponding subsystem within services framework 32 to provide a key interface between user interface layers, data management business rules, and the underlying core MDM reference data repository within database 36. Data access services 34e may be included within data management framework 78 described above with reference to FIG. 5. Since in one embodiment the predominant view of reference data 22 is object-based, data access services 34e may support a persistent mapping to underlying data structures within database 36. Accordingly, in one embodiment, data access services 34e may incorporate the concept of a data cache, such as cached data area 74 of database 36 described above, that provides a mechanism to hold a copy of reference data 22 in cached data area 74 for manipulation while maintaining the state of reference data 22 in the core MDM reference data repository of managed data area 72 as locked for read only access until the manipulation process has completed. Once a copy of reference data 22 is being held as cached data 76 within cached data area 74 during the manipulation process, the manipulation process sees only the state of cached data 76 within cached data area 74, while other processes, services, and systems associated with MDM system 4 see the true state of reference data 22 within managed data area 72 rather than an intermediate state reflecting the still incomplete manipulation process. Data access services 34e may include, without limitation: (1) a persistence management service; and (2) a data access layer service.

a. Persistence Management

The persistence management service provides the logical mapping between the user view of reference data 22 and the underlying persistent object model associated with reference data 22. The service provides for managing the creation, update, and deletion of model instances, including appropriate memory-level caching of persistent objects.

b. Data Access Layer

The data access layer service provides the link between the logical object model associated with reference data 22 and the physical instances of relational core MDM tables 96 in which the persistent objects are held as reference data 22. The separation of the persistence layer from a particular physical mapping layer allows for multiple physical targets, which is especially useful when a distributed physical data model is required (e.g., in certain cases of parameter maintenance).

6. Data Staging Services

Data staging services 34e may be provided using a corresponding subsystem within services framework 32, primarily to provide synchronization of inbound and outbound staging areas 66 and 68, respectively, with managed data area 72 of database 36. Data staging services 34e may include, without limitation: (1) a data import service; (2) a validation service; and (3) a syndication service.

a. Data Import

The data import service provides functions for moving data from external sources into database 36. For example, the data import service might be used to move existing master data into database 36 for storage and later redistribution to one or more planning, execution, monitoring, or other enterprise solution components 6. Importing data includes moving the inbound data into inbound staging area 84, validating and transforming the inbound data where appropriate, and moving the inbound data from inbound staging area 84 into the core MDM reference data repository of managed data area 72 as reference data 22.

b. Validation

The validation service allows predefined, as well as user-defined, validation rules to be applied to inbound data prior to insertion into database 36. Validation rules may include basic value type rules, referential integrity rules, enterprise-specific business rules, or any other suitable rule. In one embodiment, validation is selectable such that higher levels of validation may be used when an inbound data set is "dirty," requiring more stringent validation, and lower levels of validation may be used when an inbound data set is "clean," requiring less stringent validation.

c. Syndication

The syndication service, which essentially exports data from database 36 to planning, execution, monitoring, or other enterprise solution components 6, may have two primary elements. The first element provides functions for synchronization of core MDM tables 96 within managed data area 72 with outbound staging tables 100 within outbound staging area 86, such that a valid snapshot of reference data 22 exists at all times within outbound staging tables 100, consistent with update transaction boundaries. The second element provides functions for schedule-based or demand-based movement of data from outbound staging tables 100 to a target enterprise solution component 6.

IV. MDM Use Model

FIG. 14 illustrates an example MDM use model 140 for MDM system 4. In general, use model 140 describes how MDM system 4 will be used in terms of where data is stored and how the data is accessed. In one embodiment, the external operational systems 40a-40n that interact with MDM system 4 view MDM system 4 as a reference data repository, not as an operational data source. Accordingly, reference data 22 within core MDM reference data repository 142 may be synchronized and replicated to local persistent stores 144a-144n of external operational systems 40a-40n through appropriate external access services 146 operating in association with one or both data access layers 42. Internal access services 148 associated with managing reference data 22 within MDM system 4 may have direct access to reference data 22 within core MDM reference data repository 142. In contrast, operational services 150a-150n of external operational systems 40, which are not associated with managing reference data 22 within MDM system 4, may only access data within the associated persistent stores 144a-144n, never directly accessing reference data 22 within core MDM reference data repository 142. Thus, in essence, MDM system 4 may act as a secure system of record that is optimized in architecture and design for management of reference data 22 rather than operational use of reference data 22. Consuming services other than those related to managing reference data 22 are not permitted to directly access reference data 22.

In one embodiment, key metrics to be considered in designing a physical architecture in accordance with use model 140 may include, without limitation: (1) throughput performance; (2) query performance; (3) configuration flexibility; and (4) scale. Each of these metrics is discussed below in relation to appropriate physical characteristics of an implementation of MDM system 4.

A. Throughput Performance

The primary use model for MDM system 4 features a centralized master repository, core MDM reference data repository 142 of managed data area 72 of database 36, for the core enterprise data, reference data 22. In one embodiment, a goal is to shield core MDM reference data repository 142 from operational loading while allowing for optimal design of external operational systems 40a-40n that use reference data 22 in an operational mode. Accordingly, as described more fully above, use model 140 calls for synchronizing and replicating reference data 22 into local persistent stores 144a-144n of external operational systems 40 that use reference data 22. This implies a physical architecture and design that facilitate outbound throughput performance for moving reference data 22 from core MDM reference data repository 142 to target persistent stores 144a-144n. If reference data 22 is being moved in quantity from external operation systems 40a-40n into MDM system 4, then the physical architecture and design should preferably also support inbound throughput performance. A primary design criterion following from the above is that physical data layer 54 should provide for as efficient access to reference data 22 as possible. It may be desirable to consider any indirection layer that resides between core MDM tables 96 containing reference data 22, which may have a relational table structure, and the exterior representation of reference data 22, which may be an object representation.

B. Query Performance

The context for query performance is that of constructing views of reference data 22 for the MDM user interface or an analytics service internal to MDM system 4, such as the analytics and reporting service described above with reference to FIG. 3. Such user interface and analytics service queries are likely to be more filter-driven, looking for particular subsets of reference data 22 within a much larger row context, than any SQL or other queries associated with the bulk export of reference data 22 discussed above with respect to throughput. The structure of physical data layer 54 and the associated data access layer service should be designed to handle potentially large numbers of complex queries in a timely manner. Return of large and small query result row sets should be efficient independent of the target service (e.g., the user interface). Design criteria for query performance may include low mean query response times at the database level, sufficient performance under inbound loading involving a large number of inbound queries, and minimal latency in the associated data access layer service.

C. Configuration Flexibility

Configuration flexibility may be examined from both the user view and the solution view. With respect to the user view, reference data 22 contained in core MDM reference data repository 142 needs to be mapped to a particular data view that the enterprise requires. With respect to the solution view, where the core metrics are typically performance in replication and query performance, configuration flexibility may be less critical if not counter to those metrics. In general, it would be unwise to change reference data model 94d for each enterprise deployment, since that would imply reconfiguration of all interfaces from core MDM reference data repository 142 to local persistent stores 144a-144n of external operational systems 40a-40n. A design criterion for configuration flexibility is that reference data model 94d should be stable from deployment to deployment and should represent a superset of anticipated reference data 22 for any enterprise. Attainment of this state may be evolutionary over several deployments, but should be smoothly accomplished in a relatively short period of time without significant model redesign. If a user view mapping configuration is required, it should preferably be at the outermost layers of the design (i.e. close to the user interface rather than interior to data structures of core MDM reference data repository 142).

D. Scalability

Core MDM reference data repository 142 may hold vast amounts of reference data 22, particularly where MDM system 4 is associated with an example retail enterprise having very large numbers of items, locations, or other entities. If attribute/trait data 22e is utilized, where several hundred trait attributes per entity may be common, the potential for vast amounts of reference data 22 is even higher. These characteristics may effectively lead to large table row counts, complex relational joins, and the need for a dimension framework for reference data 22. A design criterion for scalability, which is also related to both throughput and query performance, is the ability to efficiently handle large row sets both when querying into the sets and when moving the sets. These type of efficiencies generally come from well-designed and well-tuned relational tables specifically engineered for performance-related metrics. A corollary is that the design should preferably be capable of utilizing parallel database technology if possibly required to sufficiently scale in the enterprise environment. If the design cannot utilize parallel database technology, then the option is lost when attempting to boost performance through deployment configuration.

V. User Interface Architecture

There are several drivers for the architecture and design of a user interface for MDM system 4. A first driver is the dual types of users of MDM system 4; the administrative role user and the process participant role user. The first classification of user role is concerned primarily with the administration of enterprise configuration information contained within MDM system 4, as well as the associated MDM models 114, which are realized physically in database 36. The second classification of user role is more concerned with viewing and entering information associated with processes 14, such as new item introduction for example. A modeling studio style interface may be more important to the administrative role user, while well-designed view and entry screen sequences may be more important to the process participant role user. User interface architecture and design requirements may be broken down along these or other suitable lines. A second driver is the flexibility that is inherent in the MDM architecture. In one embodiment, both reference data model 114d and staging data model 114e may be altered at the time of deployment. This provides flexibility for MDM system 4 to accommodate idiosyncrasies of the enterprise. Correspondingly, the user interface architecture preferably accommodates these flexible models. For example, if a field is added or deleted within reference data model 114d or staging data model 114e, a corresponding entry screen may accordingly adapt dynamically to the model change without the need for reprogramming.

VI. MDM Physical Architecture

FIG. 15 illustrates an example high level physical architecture 160 for MDM system 4, which may be loosely mapped to logical business architecture 10 described above with reference to FIG. 2 and logical technical architecture 30 described above with reference to FIG. 3.

In one embodiment, MDM system 4 includes a web server 162, an MDM application server layer 164, an infrastructure services application server layer 166, and an MDM database layer 168. Using a web browser or otherwise, a user associated with MDM system 4 may send a Hypertext Transport Protocol (HTTP) or other request to web server 162 to perform an appropriate operation. Web server 162 may communicate the request to one or more appropriate application servers within application server layer 164 to invoke one or more suitable applications 170a-170n. Application server layer 164 may include one or more application servers supporting engines 170a that provide process and service functions of MDM system 4, supporting the MDM user interface 170b, and supporting other suitable applications 170a-170n. Infrastructure services application server layer 164 may include one or more application servers supporting front side data access layer 42a, back side data access layer 42b, and a suitable enterprise-level workflow controller 172 that provides process and service functions associated with data access layers 42. For example, in one particular embodiment, front side data access layer 42a may be implemented using a WEBMETHODS ENTERPRISE SERVER product, back side data access layer 42b may be implemented in part using an INFORMATICA POWERCENTER product with an integrated Extract-Transform-Load (ETL) tool, and enterprise-level workflow controller 172 may be implemented using a WEBMETHODS BUSINESS INTEGRATOR product.

In one embodiment, implementation of processes 14 may be shared between enterprise-level workflow engine 172 of application server layer 164 and applications 160 of application server layer 164. Services 12 and associated services 34 may be provided primarily using application server layer 164. Database layer 168 contains the actual physical data models 114, such as reference data model 114d and staging data model 114e described above with reference to FIG. 7, with associated data services provided either at database layer 168 or application server layer 164.

VII. Example New Item Introduction Process

Figure 16:
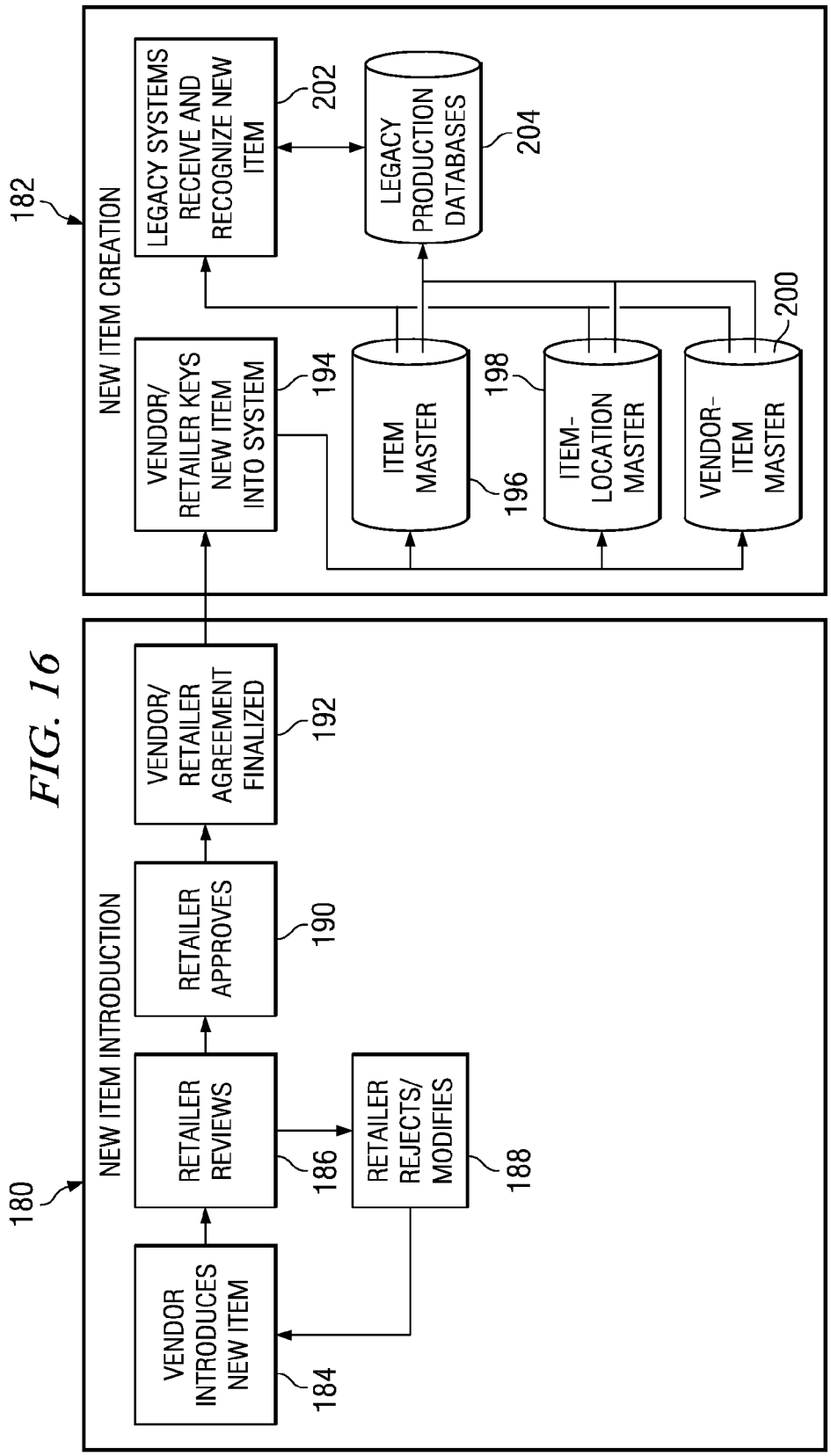
FIG. 16 illustrates an example new item introduction process provided within an MDM system.

FIG. 16 illustrates an example new item introduction process 14 provided within MDM system 4. Although introduction of a new item entity for retail and associated vendor enterprises is described as an example, the present invention contemplates analogous or other introduction of any suitable new entity for any suitable enterprise, whether or not specifically described herein.

New item introduction is a very common and integral practice for dynamic value chain partners such as retailers and finished goods vendors. The frequency of new items being introduced to a retailer assortment may vary from one to one thousand each week, depending upon the retail segment and other factors. New item introduction may be the most important phase in the life cycle of an item. This process has traditionally been highly paper intensive and has impeded the ability of retailers and vendors to introduce items on a dynamic (i.e. day-to-day) basis, since there are thousands of variables, attributes, and other factors that may need to be considered in introducing a new item at the retailer shelf, from pricing to shelf-level execution. There is a business need for retailers to automate significant portions of the new item introduction process, and to streamline integration with planning, execution, monitoring, and other enterprise component solutions, to introduce new items with a shorter time-to-market, generate customer interest, and gain market share. In one embodiment, with new item introduction process 14, MDM system 4 incorporates an embedded business workflow for new item introduction that enables an example retail enterprise to introduce a new item more quickly, more easily, with more flexibility, and with more streamlined integration with planning, execution, monitoring, or other enterprise solution components 6 than with previous techniques.

A new item may be introduced in a number of different ways. For example, a vendor may introduce the new item to a retailer, a retailer may introduce the new item through item design (i.e. for private label), or a retailer and vendor may jointly decide to introduce the new item. Although there may be slight variations in these three methods of new item introduction, since this example will focus on the workflows internal to the retailer, this description will include details of new item introduction from a generic perspective. That is, the described workflows are generic in that they outline the processes that the retailer may go through, irrespective of whether the retailer introduces the new item, the vendor introduces the new item, or the retailer and vendor jointly introduce the new item. These workflows may also be applicable across all retailer formats (e.g., mass merchant, department store, etc.) and all merchandise segments (hardlines, grocery, softlines, etc.).

As illustrated in FIG. 16, in one embodiment there are two major aspects of new item introduction process 14: (1) a first sub-process 170 involving the introduction, review, acceptance, and rejection of the new item, which may be analogized to the conception of a child; and (2) a second sub-process 172 involving the creation of the new item within the retailer for initiating various merchandising, replenishment, and supply chain planning and execution functions on the new item to make the new item available at the shelf for sale to the customer, which may be analogized to the birth of the child. First sub-process 170 may include, without limitation: a vendor introduction component 174 (where the vendor is introducing the new item), a retailer review component 176; a retailer rejection/modification component 178; a retailer approval component 180; and a vendor/retailer agreement finalization component 182. Second sub-process 172 may include a vendor/retailer keying component 184, in which the vendor or retailer creates one or more appropriate masters for the new item within database 36. Such masters may include, for example, an item master 186, an item-location master 188, and a vendor-item master 190. After creation and storage of masters for the new item according to execution of vendor/retailer keying component 184, legacy systems 192 and associated production databases 194 of the retailer or vendor may receive and recognize the new item for merchandising, replenishment, and supply chain planning and execution functions.

There may be many potential benefits of providing wholly or partially automated processes 14 for new item introduction, entry, creation, and maintenance. For example, automation of the new item introduction process may provide one or more of the following benefits, without limitation: (1) providing the retailer with the ability to merchandise and incorporate a new item into its assortments more quickly, thereby making the new item available to customers more quickly than its competitors; (2) as a result of a shorter time-to-market for new items, the retailer may considerably improve its chances of increasing sales and market share; (3) reduced labor costs and paper-flow within and across various retail functions; (4) reducing or eliminating the possibility of keying errors, thereby reducing the potential for human error; (5) providing tighter and more streamlined integration of the new item introduction process with planning, execution, monitoring, or other enterprise solution components 6, leading to better placement and replenishment of merchandise; and (6) efficiencies in planning and execution achieved through streamlined integration with new item introduction may be effectively leveraged to provide the lowest shelf-landed cost to the end-customer. With respect to tighter and more streamlined integration, examples may include, without limitation: (1) data from a vendor's quote associated with a new item may be automatically filled in for the retailer, no longer needing to be manually keyed in to finalize a contract with respect to the new item; (2) Universal Product Code (UPC) number may be automatically created for a new item once the new item has been created, no longer needing to be manually keyed in; (3) a retailer legacy system may be automatically checked to verify that a UPC number for a new item is associated with a retailer product number, no longer needing to be manually verified; and (4) in association with a merchandise planning system or other enterprise solution component 6, a product number for a new product may be automatically filled in for creation of a product assortment incorporating a new item, no longer needing to be manually keyed in.

New item introduction process 14 illustrated in FIG. 16 may be described in more detail, from introduction of the new item by the vendor through maintenance of the item by the retailer in its systems. In one embodiment, new item introduction, entry, creation, and maintenance associated with new item introduction process 14 within an example retailer may be broken down into the following primary sub-processes, without limitation: (1) an initiation sub-process; (2) a preliminary planning sub-process; (3) an item entry, approval, initial forecast estimation, and replenishment initiation sub-process; (4) an item setup, creation, activation, and initial replenishment sub-process; (5) an item merchandising and shelf execution setup sub-process; (6) an item forecast entry and replenishment sub-process; (7) an order management and collaboration sub-process; (8) inbound (vendor-to-retailer) and outbound (retailer-to-location) supply chain planning and execution sub-processes; (9) an item maintenance sub-process; and (10) an exceptions handling and management sub-process.

Although the present invention has been described with several embodiments, a plethora of changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A system for managing core enterprise reference data associated with an enterprise, comprising:
a centralized master repository tangibly embodied on a computer-readable medium and comprising the core enterprise reference data, the core enterprise reference data associated with a plurality of data schemas, each data schema comprising one or more data models for core enterprise reference data, each data model comprising one or more fields; and
a data management services framework tangibly embodied on a computer-readable medium and configured to provide services that manage the core enterprise reference data in the centralized master repository, the data management services framework including a data management services framework subsystem configured to provide data access services between user interface levels, data management rules, and the centralized master repository wherein at least one of the data management rules comprises a validation rule that automatically selects a level of validation based on one or more characteristics of inbound data.

2. The system of claim 1, wherein the data management services framework subsystem is further configured to provide data access services that support a persistent mapping to underlying data structures within a database.

3. The system of claim 1, wherein the data management services framework subsystem is further configured to provide data access services including a data cache.

4. The system of claim 3, wherein a copy of the core enterprise reference data is held in the data cache for manipulation.

5. The system of claim 4, wherein the state of the core enterprise reference data in a core data repository that corresponds to the copy of the core enterprise reference data held in the data cache is maintained as locked for read only access until the manipulation process is completed.

6. The system of claim 4, wherein the data management services framework subsystem provides data staging services.

7. The system of claim 6, wherein the data staging services include synchronization of inbound and outbound staging areas with managed data areas of a database.

8. A method for managing core enterprise reference data associated with an enterprise, comprising:
using a centralized master repository to store core enterprise reference data, the core enterprise reference data associated with a plurality of data schemas, each data schema comprising one or more data models for core enterprise reference data, each data model comprising one or more fields; and
using a data management services framework coupled with the centralized master repository that provides services to manage the core enterprise reference data in the centralized master repository, the data management services framework including a data management services framework subsystem that provides data access services between user interface levels, data management rules, and the centralized master repository wherein at least one of the data management rules comprises a validation rule that automatically selects a level of validation based on one or more characteristics of inbound data.

9. The method of claim 8, further comprising using the data management services framework subsystem to provide data access services that support a persistent mapping to underlying data structures within a database.

10. The method of claim 8, further comprising using the data management services framework subsystem to provide data access services including a data cache.

11. The method of claim 10, further comprising holding a copy of the core enterprise reference data in the data cache for manipulation.

12. The method of claim 11, further comprising maintaining the state of the core enterprise reference data in a core data repository that corresponds to the copy of the reference data held in the data cache as locked for read only access until the manipulation process is completed.

13. The method of claim 8, further comprising using the data management services framework subsystem to provide data staging services.

14. The method of claim 13, wherein the data staging services include synchronization of inbound and outbound staging areas with managed data areas of a database.

15. A non-transitory computer-readable medium embodied with software for managing core enterprise reference data associated with an enterprise, the software when executed using one or more computers is configured to:
- access a centralized master repository to store core enterprise reference data, the core enterprise reference data associated with a plurality of data schemas, each data schema comprising one or more data models for core enterprise reference data, each data model comprising one or more fields; and
- provide a data management services framework coupled with the centralized master repository and providing services that manage the core enterprise reference data in the centralized master repository, the data management services framework including a data management services framework subsystem configured to provide data access services between user interface levels, data management rules, and the centralized master repository wherein at least one of the data management rules comprises a validation rule that automatically selects a level of validation based on one or more characteristics of inbound data.

16. The computer-readable medium of claim 15, wherein the software is further configured to provide a data management services framework subsystem of the data management services framework that provides data access services that support a persistent mapping to underlying data structures within a database.

17. The computer-readable medium of claim 15, wherein the software is further configured to provide a data management services framework subsystem of the data management services framework that provides data access services including a data cache.

18. The computer-readable medium of claim 17, wherein the software is further configured to hold a copy of the core enterprise reference data in the data cache for manipulation.

19. The computer-readable medium of claim 18, wherein the software is further configured to maintain the state of the core enterprise reference data in a core data repository that corresponds to the copy of the core enterprise reference data held in the data cache as locked for read only access until the manipulation process is completed.

20. The computer-readable medium of claim 18, wherein the software is further configured to provide data staging services provided by the data management services framework subsystem.

21. The computer-readable medium of claim 18, wherein the software is further configured to provide data staging services including synchronization of inbound and outbound staging areas with managed data areas of a database.

* * * * *